US007631197B2

(12) United States Patent
Niwamoto et al.

(10) Patent No.: US 7,631,197 B2
(45) Date of Patent: Dec. 8, 2009

(54) CONTROL DEVICE, COMMUNICATION DEVICE FOR CONTROL, RELAY DEVICE, CONTROL SYSTEM, CONTROL METHOD, CONTROL PROGRAM TO REALIZE CONTROL METHOD THEREOF, AND COMPUTER-READABLE RECORDING MEDIUM HAVING PROGRAM THEREOF RECORDED

(75) Inventors: Hiroaki Niwamoto, Nara (JP); Yasuo Ozawa, Vancouver, WA (US); Yumi Shiraishi, Tenri (JP); Ikuo Keshi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 651 days.

(21) Appl. No.: 10/551,347

(22) PCT Filed: Mar. 9, 2004

(86) PCT No.: PCT/JP2004/003050

§ 371 (c)(1),
(2), (4) Date: Sep. 28, 2005

(87) PCT Pub. No.: WO2004/091247

PCT Pub. Date: Oct. 21, 2004

(65) Prior Publication Data

US 2006/0259784 A1 Nov. 16, 2006

(30) Foreign Application Priority Data

Mar. 31, 2003 (JP) ............................. 2003-095100

(51) Int. Cl.
*G06F 12/14* (2006.01)
*G06F 7/04* (2006.01)
*H04L 29/06* (2006.01)

(52) U.S. Cl. ........................... 713/193; 713/153; 726/4; 726/27

(58) Field of Classification Search ....................... None
See application file for complete search history.

(56) References Cited

U.S. PATENT DOCUMENTS 6,133,847 A * 10/2000 Yang ..................... 340/825.22
6,919,790 B2 * 7/2005 Kanazawa ................. 340/5.21
2003/0105854 A1 * 6/2003 Thorsteinsson et al. ..... 709/223

FOREIGN PATENT DOCUMENTS

| | | | |
|---|---|---|---|
| GB | 2 344 675 | A | 6/2000 |
| JP | 10-136110 | A | 5/1998 |
| JP | 2000-184471 | A | 6/2000 |
| JP | 2002-34023 | A | 1/2002 |
| JP | 2002-232978 | A | 8/2002 |
| JP | 2002-291057 | A | 10/2002 |
| WO | WO-02/05118 | A2 | 1/2002 |

* cited by examiner

*Primary Examiner*—Kaveh Abrishamkar
(74) *Attorney, Agent, or Firm*—Birch, Stewart, Kolasch & Birch, LLP

(57) ABSTRACT

A gateway device includes a third block communicating information, and a control unit controlling the third block so as to generate second information representing an operation of an air conditioner and to transmit the second information to the air conditioner based on first information representing control contents of the air conditioner received by the third block. Accordingly, an apparatus connected to a network and absent of a high-level circuit can be controlled at high level.

5 Claims, 15 Drawing Sheets

CONTROL DEVICE, COMMUNICATION DEVICE FOR CONTROL, RELAY DEVICE, CONTROL SYSTEM, CONTROL METHOD, CONTROL PROGRAM TO REALIZE CONTROL METHOD THEREOF, AND COMPUTER-READABLE RECORDING MEDIUM HAVING PROGRAM THEREOF RECORDED

TECHNICAL FIELD

The present invention relates to a control device controlling an appliance, a communication device for control, a relay device, a control system, a control method, a control program to realize that control method, and a computer-readable recording medium having that program recorded. Particularly, the present invention relates to a control device for remote-controlling and monitoring, as necessary, electrical household appliances through radio communication and the like, a communication device for control, a relay device, a control system, a control method, a control program to realize that control method, and a computer-readable recording medium having that program recorded.

BACKGROUND ART

Conventionally, air conditioners are controlled by operating an ancillary remote controller. The user operates the button on the remote controller, whereby information of controlling the air conditioner is transmitted to the air conditioner main unit through infrared communication. The air conditioner main unit initiates an operation upon receiving the control information. The air conditioner main unit notifies the user of receiving control information by sounding a beep or the like. Whether the appliance is operating as desired or not is confirmed visually. This may also be confirmed by the beeping sound from the appliance. Such confirmation is allowed since the user controls the appliance within the coverage of the signal under infrared communication. In other words, the user can conduct remote-control of the appliance only in the range where the signal of infrared communication can be reached.

To effect control of an electrical household appliance such as an air conditioner, it was necessary to use a dedicated remote controller associated with each appliance. The user had to administer a plurality of remote controllers corresponding to the number of the appliances he/she posses.

To solve such a problem, development of a universal remote controller taking advantage of a network is in progress. A universal remote controller can control a plurality of appliances through one remote controller.

The architecture of a network to derive the maximum performance of a universal remote controller is also in progress. The communication standard of ECHONET (R), for example, is one of such networks. Household appliances are connected to a communication network called the ECHONET (R) to allow control from a control apparatus on the network.

Various approaches have been proposed based on such techniques. Specifically, Japanese Patent Laying-Open No. 2002-232978 (Patent Document 1) discloses a remote controller transmitting control information including an ID for identifying a target device that is to be controlled, and a converter converting the control information into a protocol suited to the device that is to be controlled, directed to controlling devices connected to the network. Japanese Patent Laying-Open No. 2002-34023 (Patent Document 2) discloses a communication system transmitting to a base apparatus the information entered by the user through a touch panel on a display device when the user is to control a device located far away. The base apparatus transmits control signals that are a converted version of the information towards the target under-control device.

However, Patent Document 1 discloses the problem that the cost is increased when control information of appliances connected to the network is to be converted into a protocol corresponding to the network. This is because, in order to realize such network communication control, high-level circuits such as a memory circuit and control device having a capacity considerably greater than that of the software in conventional apparatuses are required. The reason why such high-level circuits are required is due to the large capacity and high level of software and the like. In the case where an appliance is controlled through the network, there may be an event of a plurality of users controlling a plurality of appliances using a plurality of universal remote controllers. This corresponds to the case where high-level control complying with the plurality of users is required. For example, the control and user interface may have to differ for each user. The foregoing converter provides no measures for such circumstances.

A similar problem occurs in the case where control signals corresponding to a converted version of the input information are to be transmitted, as disclosed in Patent Document 2. This control system simply converts the protocol. It provides no solving means for a high-level circuit and the like in accordance with the networked appliance. Thus, a similar problem occurs.

In view of the foregoing, an object of the present invention is to provide a control device that can control at high level an appliance connected to a network, particularly an appliance connected to a network and absent of a high-level circuit, a communication device for control, a relay device, a control system, a control method, a control program to realize the control method, and a computer-readable recording medium having the program recorded.

DISCLOSURE OF THE INVENTION

According to an aspect of the present invention, a control device includes first communication means for communicating information, generation means for generating, based on first information representing control contents of an appliance received from the first communication means, second information representing an operation of the appliance, and first control means for controlling the first communication means such that the second information is transmitted to the appliance.

Accordingly, the second information representing an operation of the appliance is generated at the control device. As a result, a control device that can control at high level an appliance connected to a network and absent of a high-level circuit, can be provided.

The generation means set forth preferably includes first storage means for storing third information representing an operation to generate the second information, and operation means for generating the second information by an operation represented by the third information.

Accordingly, the second information representing an operation of the appliance is generated by an operation represented by the third information. As a result, a control device that can control at high level an appliance connected to a network and absent of a high-level circuit can be provided.

Alternatively, the first storage means set forth above preferably includes modification means for storing the third information such that at least a portion can be modified.

Alternatively, the first storage means set forth above preferably includes means for storing a plurality of third information in correspondence with the appliance. In addition, the control device further preferably includes select means for selecting any of the plurality of third information based on fourth information that identifies the appliance and received by the first communication means. In addition, the operation means preferably includes means for generating the second information by an operation represented by the third information selected by the select means.

Accordingly, the operation means can generate second information by any of a plurality of operations, based on a transmission source. As a result, a control device that can control at high level a plurality of appliances connected to a network and absent of a high-level circuit, can be provided.

The first communication means set forth above preferably includes a plurality of communication means selectively used according to a transmission destination.

Furthermore, the control device set forth above preferably includes second storage means for storing, in correspondence with a user, fifth information representing a permitted appliance of which an operation by the user is permitted among appliances, and second control means for controlling the first communication means such that information including the fifth information corresponding to a user of a transmission source of the first information is transmitted to the transmission source in response to reception, by the first communication means, of seventh information identifying the user of the transmission source of the first information and eighth information requesting identification of an appliance.

Accordingly, the fifth information corresponding to a user can be transmitted to the transmission source. As a result, a control device that can control at high level an appliance connected to a network and absent of a high-level circuit, and that can transmit information corresponding to the user to the transmission source, can be provided.

The control device set forth above preferably includes means for counting time. In addition, the information transmitted by the second control means preferably includes information representing the time.

The control device set forth above preferably includes determination means for determining whether the second information is to be generated or not by the generation means based on the information identifying the transmission source.

Accordingly, determination can be made as to whether the second information is to be generated or not by the generation means, based on the transmission source. As a result, a control device that can control at high level an appliance connected to a network and absent of a high-level circuit, based on the determination of the transmission source, can be provided.

Alternatively, the information identifying the transmission source set forth above preferably includes any of the seventh information identifying the user of the transmission source and the tenth information identifying a device of the transmission source.

Accordingly, determination can be made as to whether the second information is to be generated or not by the generation means, based on any of the user of the transmission source and the device of the transmission source. As a result, a control device that can control at high level an appliance connected to a network and absent of a high-level circuit, based on any of the user of the transmission source and the device of the transmission source, can be provided.

The control device set forth above preferably includes second control means for controlling the first communication means such that ninth information including the information to identify an appliance is transmitted to the transmission source based on sixth information identifying the transmission source of the first information.

Accordingly, information identifying an appliance can be transmitted based on the transmission source. As a result, a control device that can control at high level an appliance connected to a network and absent of a high-level circuit, and that can transmit information identifying an appliance based on the transmission source, can be provided.

Alternatively, the sixth information set forth above preferably includes seventh information identifying the user of the transmission source and tenth information identifying a device of the transmission source. In addition, the second control means preferably includes means for controlling the first communication means such that ninth information is transmitted in a manner suiting the device and the user of the transmission source, based on the seventh information and the tenth information.

Alternatively, the second control means set forth above preferably includes means for controlling the first communication means such that the ninth information is transmitted, in response to reception of the eighth information requesting identification of an appliance by the first communication means.

Furthermore, the control device set forth above preferably includes second communication means for communicating information, and third control means for controlling the first communication means and second communication means such that eleventh information communicated using one of the first communication means and second communication means is transmitted to a communication destination differing from the communication destination of the eleventh information using the other of the first and second communications means.

According to another aspect of the present invention, a communication device for control includes input means for entering information, generation means for generating identification information identifying a user of the communication device for control and a communication device for control, based on information input by the input means, transmission and reception means for transmitting identification information and receiving reception information transmitted based on the identification information, and output means for providing the reception information.

Accordingly, information identifying the user of the communication device for control and the communication device for control are transmitted, so that information transmitted based on such information can be received. As a result, a communication device for control that can control at high level an appliance connected to a network, based on the identification of both the user and the communication device for control, can be provided.

Furthermore, the identification information set forth above preferably includes seventh information identifying a user of the communication device for control, and tenth information identifying a communication device for control.

Accordingly, information identifying the user of the communication device for control and the communication device for control are transmitted, so that information transmitted based on the information can be received. As a result, a communication device for control that can control at high level an appliance connected to the network, based on the identification of both the user and the communication device for control, can be provided.

Any of the seventh information and tenth information set forth above preferably includes information unique to an identified subject.

Accordingly, information transmitted based on information unique to an identified subject can be received. As a result, a communication device for control that can control reliably and at high level an appliance connected to a network, based on identification of both the user and the communication device for control, can be provided.

The output means set forth above preferably includes means for providing reception information in response to input of predetermined information at the input means.

According to a further aspect of the present invention, a control system includes a communication device for control, a control device, a relay device, and an appliance. The communication device for control includes input means for entering information, communication means for communicating information, and output means for providing information received by the communication means. The control device includes first communication means for communicating information, generation means for generating, based on first information representing control contents of an appliance, received from the communication device for control by the first communication means, second information representing an operation of the appliance, and first control means for controlling the first communication means such that the second information is transmitted to the appliance. The relay device includes input means for entering input information from an appliance, first conversion means for converting the input information into information to be transmitted to the control device, communication means for communicating with the control device, second conversion means for converting the information received from the control device into conversion information that can be used by the appliance, and output means for providing the conversion information to the appliance. The appliance includes control means for controlling the appliance based on the conversion information, and output means for providing information related to control by the control means.

Accordingly, the second information representing an operation of the appliance is generated at the control device. As a result, a control system that can control at high level an appliance connected to a network and absent of a high-level circuit, can be provided.

In the control system set forth above, the communication device for control preferably includes generation means for generating communication information that identifies any of the communication device for control itself and the user of the communication device for control. In addition, the communication means of the communication device for control preferably includes transmission and reception means for transmitting communication information, and receiving reception information transmitted based on the communication information.

In the control system set forth above, the communication device for control preferably includes generation means for generating communication information that identifies the communication device for control itself and the user of the communication device for control. In addition, the communication means of the communication device for control preferably includes transmission and reception means for transmitting communication information and receiving reception information transmitted based on the communication information.

The output means of the communication device for control set forth above preferably includes means for providing reception information in response to input of predetermined information at the input means of the communication device for control.

Furthermore, the control device set forth above preferably includes second storage means for storing, in correspondence with a user, fifth information representing a permitted apparatus of which an operation by the user is permitted among appliances, and second control means for controlling first communication means such that information including the fifth information corresponding to a user of a transmission source is transmitted to the transmission source in response to reception, by the first communication means, of seventh information identifying the user of the transmission source of the first information and eighth information requesting identification of the appliance.

Alternatively, the second control means set forth above preferably includes means for controlling the first communication means such that ninth information is transmitted in a manner suiting the communication device for control and the user of the transmission source, based on the seventh information identifying the user of the transmission source received by the first communication means, and tenth information identifying the communication device for control of the transmission source.

The control device set forth above preferably includes second control means for controlling the first communication means such that ninth information including information identifying an appliance is transmitted to the transmission source based on sixth information identifying a transmission source of the first information.

Furthermore, the control device set forth above preferably includes means for counting the time. In addition, the information to be transmitted by the second control means preferably includes information representing the time.

Furthermore, the control device set forth above preferably includes determination means for determining as to whether second information is to be generated or not by the generation means based on information identifying the transmission source.

Alternatively, the information identifying the transmission source set forth above preferably includes any of the seventh information identifying the user of the transmission source and the tenth information identifying the communication device for control of the transmission source.

Furthermore, the generation means set forth above preferably includes first storage means for storing, in correspondence with any of the communication device for control itself and the user of the communication device for control, a plurality of third information representing an operation to generate the second information, and operation means for generating second information by an operation based on any of the plurality of third information. In addition, the control device preferably includes select means for selecting third information used in generation of the second information from any of the plurality of third information, based on communication information identifying any of the communication device for control itself and the user of the communication device for control, received by the first communication means.

Furthermore, the control device set forth above preferably includes second communication means for communicating information, and third control means for controlling the first communication means and second communication means such that eleventh information communicated using one of the first communication means and the second communication means is communicated to a communication destination differing from the communication destination of the eleventh information using the other of the first and second communication means.

According to still another aspect of the present invention, a relay circuit is employed in a control system that includes a communication device for control, a control device, a relay device, and an appliance. The relay device includes input means for entering input information from the appliance, first conversion means for converting the input information into information to be transmitted to the control device, communication means for communicating with the control device, second conversion means for converting the information received from the control device into conversion information that can be used by the appliance, and output means for providing the conversion information to the appliance.

Accordingly, information between the control device and the appliance can be converted. As a result, a relay device that can convert information in a control system that can control at high level an appliance connected to a network and absent of a high-level circuit, can be provided.

According to a still further aspect of the present invention, a control method includes a first communication step of communicating information, a generation step of generating second information representing an operation of the appliance, based on the first information representing control contents of an appliance received at the first communication step, and a first control step of controlling the first communication step such that the second information is transmitted to the appliance.

Thus, a control method that can control at high level an appliance connected to a network and absent of a high-level circuit, can be provided.

According to yet a further aspect of the present invention, a control program causes a computer to execute a first communication step of communicating information, a generation step of generating second information representing an operation of the appliance, based on the first information representing control contents of the appliance received at the first communication step, and a first control step of controlling the first communication step such that the second information is transmitted to the appliance.

Thus, a program that realizes a control method that can control at high level an appliance connected to a network and absent of a high-level circuit, can be provided.

According to yet another aspect of the present invention, a recording medium corresponds to a computer-readable recording medium having a control program recorded to cause a computer to realize: a first communication step of communicating information, a generation step of generating second information representing an operation of the appliance, based on the first information representing control contents of the appliance received at the first communication step, and a first control step of controlling the first communication step such that the second information is transmitted to the appliance.

Thus, a computer-readable recording medium having a program recorded that realizes a control method of controlling at high level an appliance connected to a network and absent of a high-level circuit, can be provided.

BEST MODES FOR CARRYING OUT THE INVENTION

Figure 1:
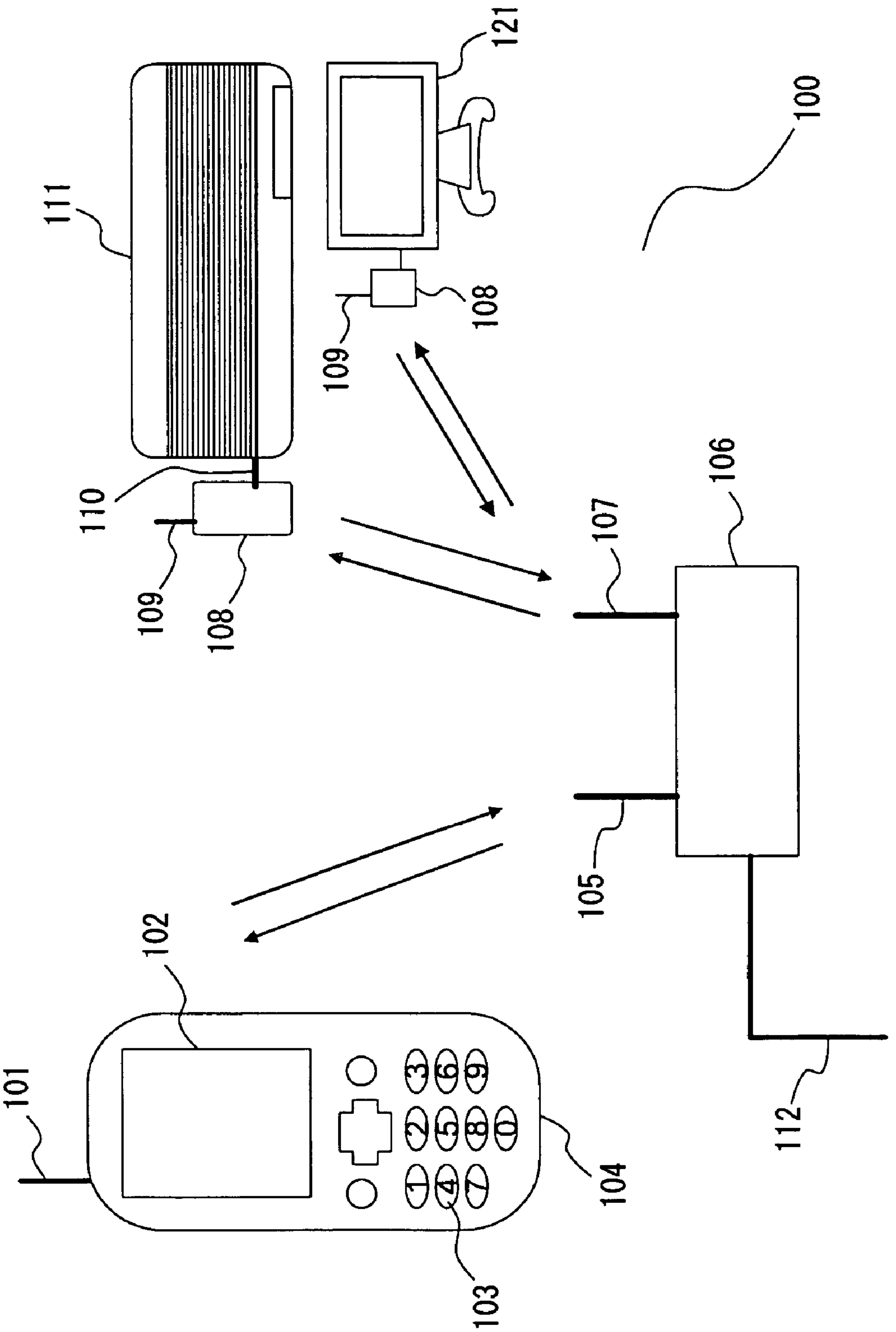
FIG. 1 is a diagram to describe a configuration of a communication system according to an embodiment of the present invention.

Embodiments of the present invention will be described hereinafter with reference to the drawings. In the following, the same components have the same reference characters allotted. Their designation and function are also identical. Therefore, detailed of the description thereof will not be repeated.

<<System Overview >>

Referring to FIG. 1, a communication system 100 according to an embodiment of the present invention includes a remote-control device 104, a gateway device 106, a communication adaptor 108, as well as an air conditioner 111, a television 121, and a washing machine (not shown) as electric household appliances (hereinafter referred to as "appliance"). Gateway device 106 can communicate individually with a plurality of remote-control devices 104 and a plurality of communication adaptors 108. Gateway device 106 includes a storage unit (ROM 801 and the like) that will be described afterwards to store application software and a database of remote-control devices 104 and/or users. Communication adaptor 108 is a device for relaying data between gateway device 106 and an appliance (air conditioner 111 in present embodiment). Communication adaptor 108 is connected to air conditioner 111 and television 121 through cable.

The number of gateway devices 106 is not necessarily one. A plurality of gateway devices 106 may communicate with one remote-control device 104. These gateway devices 106 may communicate information received from remote-control device 104 to relevant appliances through a protocol differing for each appliance (or through a different communication module).

<<Configuration of Device>>

[Remote-Control Device 104]

<Configuration of Remote-Control Device 104>

Figure 2:
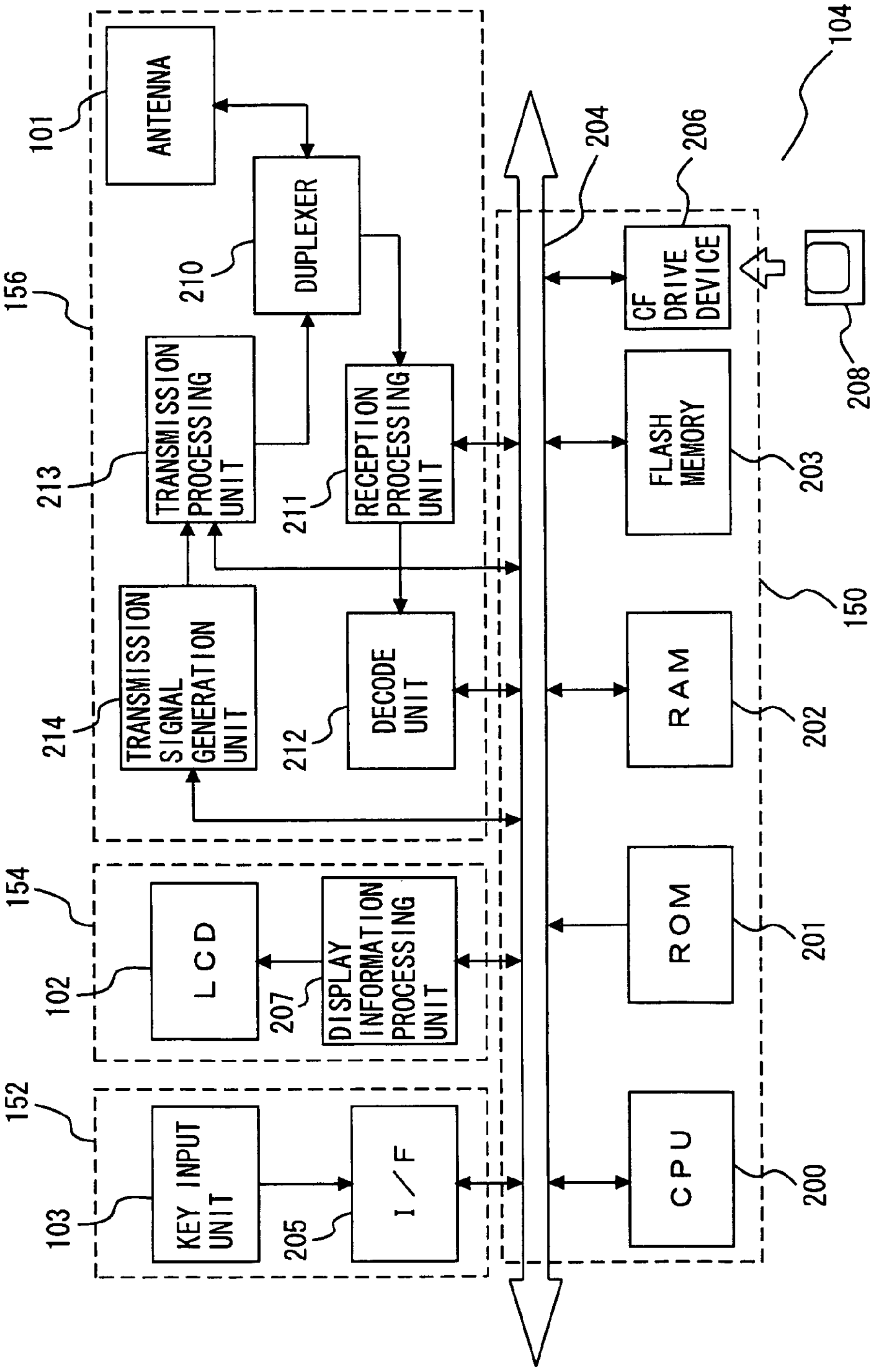
FIG. 2 is a block diagram of a remote-control device according to an embodiment of the present invention.

Referring to FIG. 2, remote-control device 104 includes a control unit 150, a first block 152, a second block 154, and a third block 156.

<Configuration of Control Unit 150>

Control unit 150 controls each element of remote-control device 104. Control unit 150 is a microcomputer including a CPU (Central Processing Unit) 200, a ROM (Read Only Memory) 201, a RAM (Random Access Memory) 202, a flash memory 203, and a CF (Compact Flash) memory card drive device 206. Control unit 150 is connected through a CPU bus 204.

ROM 201 stores a portion of the control program as well as data required for processing. RAM 202 stores various processing programs. RAM 202 is also employed as a working area for various processes. As an example, it is used as a temporary storage region of data obtained at various processes. Flash memory 203 is a non-volatile memory. The information stored in flash memory 203 will not be lost even if the power is turned off. CF memory card drive device 206 has a CF memory card 208 loaded thereto.

<Configuration of First Block 152>

First block 152 is a block for the user to enter information to remote-control device 104. First block 152 includes a key input unit 103, and an interface 205. Key input unit 103 includes a ten-key, a cursor key, and the like. The user can enter information and the like required for various setting using key input unit 103.

<Configuration of Second Block 154>

Second block 154 is a block to output information to the user. Second block 154 includes an LCD (Liquid Crystal Display) 102 that is a display element, and a display information processing unit 207. LCD 102 displays information obtained from the reception signal, as necessary. Display information processing unit 207 forms a display signal based on the information supplied from control unit 150. Display information processing unit 207 provides this signal to LCD 102.

<Configuration of Third Block 156>

Third block 156 is a block to conduct radio communication with gateway device 106. Third block 156 includes a communication antenna 101, a duplexer 210, a reception processing unit 211, a decode unit 212, a transmission processing unit 213, and a transmission signal generation unit 214. Communication antenna 101 establishes radio communication with gateway device 106. Duplexer 210 functions to prevent interference between a transmission signal and a reception signal. Reception processing unit 211 carries out processing such as demodulation of a supplied signal. Decode unit 212 supplies the signal demodulated at reception processing unit 211 to control unit 150. Transmission processing unit 213 carries out processing such as modulating and/or amplifying a supplied transmission signal to form a transmission signal in the format that is to be actually transmitted. Transmission signal generation unit 214 converts the transmitted information from control unit 150 into a transmission signal for transmission to gateway device 106, and supplies the converted signal to transmission antenna 101 through duplexer 210.

The present device is realized by computer hardware and software executed by CPU 200. Such software is distributed in a stored form in a recording medium such as a CF memory card 208, and read out from the recording medium by CF memory card drive device 206 and the like. The software read out is temporarily stored in RAM 202. This software is executed by CPU 200. The hardware per se of the computer is a general one. Therefore, the most essential portion of the present invention corresponds to the software recorded in a recording medium such as CF memory card 208.

Since the operation of the computer per se shown in the drawings is well known, detailed description thereof will not be repeated here.

[Gateway Device 106]

<Configuration of Gateway Device 106>

Figure 3:
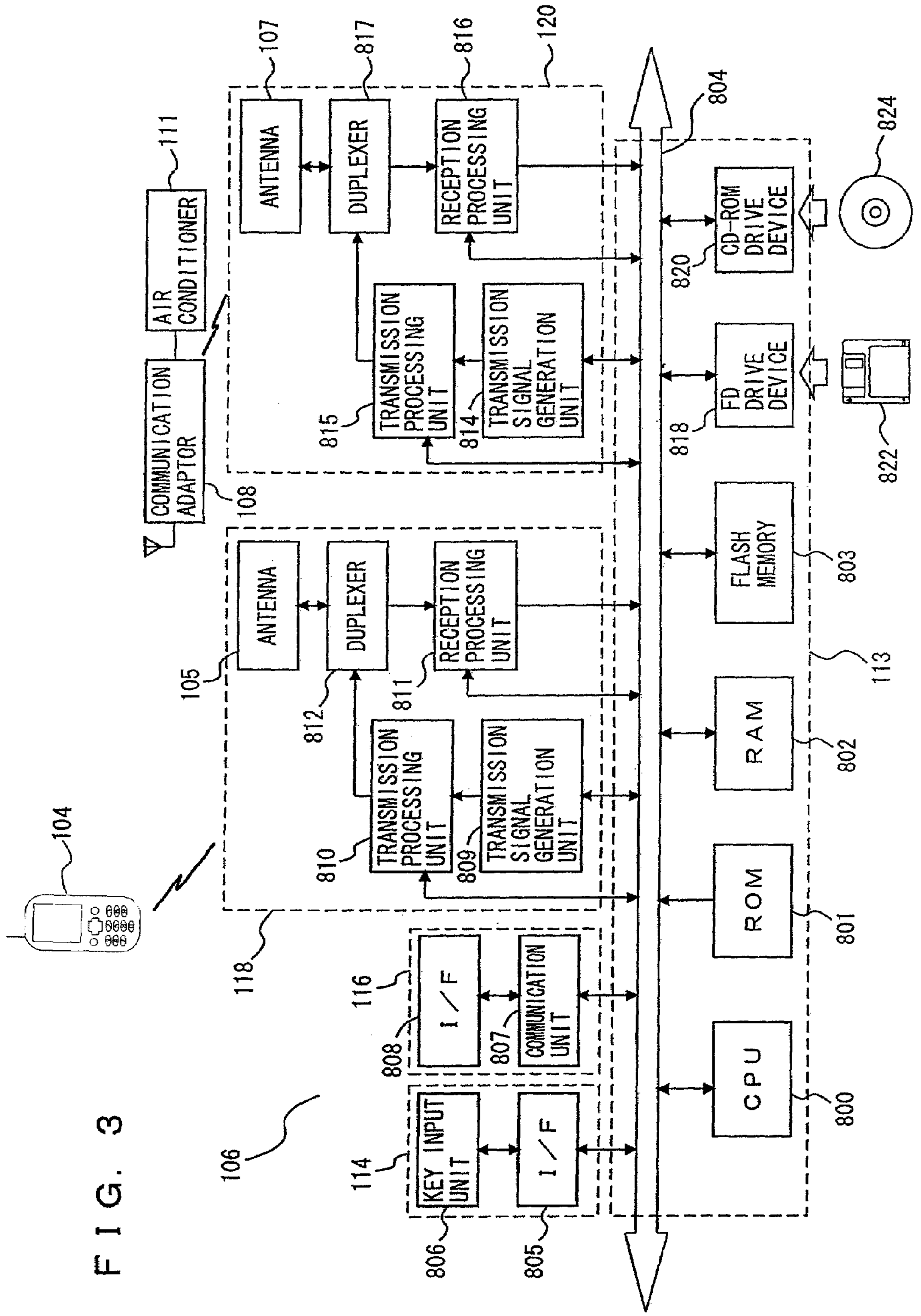
FIG. 3 is a block diagram of a gateway device according to an embodiment of the present invention.

Referring to FIG. 3, gateway device 106 includes a control unit 113, a first block 114, a second block 116, a third block 118, and a fourth block 120.

<Configuration of Control Unit 113>

Control unit 113 controls various elements of gateway device 106. Control unit 113 is a microcomputer, including a CPU 800, a ROM 801, a RAM 802, a flash memory 803, an FD (Flexible Disk) drive device 818, and a CD-ROM (Compact Disk Read Only Memory) drive device 820. Control unit 113 is connected via a CPU bus 804. ROM 801, RAM 802, and flash memory 803 are generically referred to as a storage unit.

The operation of CPU 800 will be described hereinafter. The first operation corresponds to control of various elements of control unit 113. The second operation corresponds to counting the time. The third operation corresponds to information processing required to control an appliance. This information processing is directed to specifically ascertaining the operation of each appliance. Accordingly, CPU 800 partakes a portion of the function of each appliance. As a result, each appliance, though absent of a circuit or the like corresponding to a certain function, can function in a manner similar to that of an appliance including such a circuit. This will be described afterwards based on a specific example.

ROM 801 stores various processing programs and data required for respective processing. The required data includes an apparatus ID under control of gateway device 106. Respective processing programs are executed at control unit 113 of gateway device 106. The processing program includes, for example, a news application, a weather application, a provider application, and the like. News application is directed to connecting to the Internet via a telephone line 112 to receive presentation of information such as news, and to transmit mail received from remote-control device 104. The weather application is directed to receiving information such as the weather forecast in accordance with a method similar to that of a news application. The provider application is directed to establishing access to the data stored in flash memory 803 to present the information to the user. These applications include a database to notify the user of information according to the role of each application. This information is referred to as event information. Control unit 113 executing these applications generates event information using the data included in the database, and information obtained from an appliance such as air conditioner 111 and/or information obtained from an appliance establishing communication through telephone line 112. A specific example of the event information will be described afterwards.

RAM 802 is used as the working area for various processing. For example, it is used as a temporary storage region for data obtained at respective processing. RAM 802 additionally serves to store the user ID, the control apparatus ID of remote-control device 104, and control applications. The user ID and the control apparatus ID of remote-control device 104 are stored in RAM 802 in the form of a database. The control application is directed to controlling and monitoring an appliance connected to communication adaptor 108. The control application carries out such processes by communicating with communication adaptor 108 through radio communication. The control application includes an air conditioner application that will be described afterwards. Other control applications include a television application for controlling and/or monitoring television 121, and a washing machine application for controlling and/or monitoring a washing machine. These applications are set corresponding to a relevant appliance. CPU 800 determines the application to be activated based on the information identifying an appliance, transmitted from remote-control device 104. Specific contents of this information identifying an apparatus will be described afterwards. In the present embodiment, all these applications represent programs. However, the application is not particularly limited to a program, and is arbitrary as long as it can generate information representing an operation of an appliance. For example, a predetermined data row may be employed instead of an application. In this case, CPU 800 uses such a data row to activate a program that generates or controls information representing an operation of an appliance. CPU 800 selects a data row to generate information representing an operation of an appliance from a predetermined data row in that program. Selection of a data row is based on information specifying an appliance, transmitted from remote-control device 104. When a new control application is added, it is stored in RAM 802.

Flash memory 803 is a non-volatile memory. Flash memory 803 stores a user authentication database, a remote-control device database, a user access database, a user customized database, various setting parameters, and the like. The information stored in flash memory 803 will not be lost even if the power is turned off. The user authentication database is based on elements such as a user ID (Identification Data) identifying a user, an application ID identifying an application that can be controlled by the user, and the like. The remote-control device database is based on elements such as a control apparatus ID identifying a remote-control device 104, the size and performance of the LCD of that apparatus, the apparatus processing ability, and the like. The user access database is based on the elements of a user ID identifying a user and a control apparatus ID identifying a remote-control device 104. This database serves to identify which user is conducting communication from which remote-control device 104. The user customized database is based on the elements of a user ID identifying a user and application information. Application information corresponds to display information and the like customized for display at remote-control device 104 according to the user. The user customized database is generated by respective applications.

The present device is realized by computer hardware and software executed by CPU 800. In general, such software is distributed in a stored form in a recording medium such as a FD 822 or a CD-ROM 824, and read out from the recording medium by an FD drive device 818, a CD-ROM 820 drive device, or the like. The software read out is temporarily stored in RAM 802. The software is executed by CPU 800. The computer hardware per se shown here is a general one. Therefore, the most essential portion of the present invention corresponds to the software recorded in a recording medium such as FD 822 or CD-ROM 824.

Since the operation of the computer per se shown in the drawings is well-known, details of the description thereof will not be repeated.

RAM 802 can also store the software of a control application that can have the contents arbitrarily modified. Such a control application may be rewritable for each software via CD-ROM 824, or a portion of the software may be rewritable using an editor or the like.

Gateway device 106 may be a device including a communication circuit for each group of a plurality of appliances. Gateway device 106 may be a device including a communication circuit for each appliance.

<Configuration of First Block 114>

First block 114 is a block for the user to directly control gateway device 106. First block 114 includes an interface 805, and a key input unit 806. Key input unit 806 includes a power-on key and various setting keys. The user can turn on/off the main power of gateway device 106 and/or enter various settings through key input unit 806.

<Configuration of Second Block 116>

Second block 116 is a block for connection with a telephone network and/or a communication network such as the Internet through a telephone line 112. Second block 116 includes a communication unit 807 and an interface 808. Communication unit 807 includes a modem identified as a modulator-demodulator. Communication unit 807 communicates various data with a party connected to telephone line 112. In a transmission mode, communication unit 807 modulates signals from control unit 113, and supplies the modulated signals to interface 808. In a reception mode, communication unit 807 demodulates the signals from interface 808, and supplies the demodulated signals to control unit 113. Interface 808 is an interface between telephone line 112 and communication unit 807 of gateway device 106. Interface 808 receives signals transmitted through telephone line 112, and transmits the signals from gateway device 106 to telephone line 112. Gateway device 106 can be connected to the Internet via communication unit 807, interface 808, telephone line 112, and a predetermined ISP (Internet Service Provider). Upon connection to the Internet, gateway device 106 can receive news information as well as transmit/receive electronic mail.

<Configuration of Third Block 118>

Third block 118 is a block to establish radio communication with remote-control device 104. In the present embodiment, the radio communication between remote-control device 104 and gateway device 106 is established using a specific low-power radio communication. The application directed to communication has a predetermined channel frequency of the specific low power radio communication specified in advance. Third block 118 includes a first antenna 105, a transmission signal generation unit 809, a transmission processing unit 810, a reception processing unit 811, and a duplexer 812. First antenna 105 transmits/receives a radio wave to/from an appliance (air conditioner 111 in the present embodiment). Transmission signal generation unit 809 converts the information generated by CPU 800 into a transmission signal for transmission to remote-control device 104. Transmission processing unit 810 forms a transmission signal in the format that is to be actually transmitted by a process of modulating and amplifying a transmission signal. Transmission processing unit 810 transmits through radio a transmission signal in the format that is to be actually transmitted to remote-control device 104 via duplexer 812 and first antenna 105. Reception processing unit 811 carries out a process such as demodulation on the supplied signal to provide the signal subjected to demodulation to control unit 113. Duplexer 812 functions to prevent interference between a transmission signal and a reception signal.

<Configuration of Fourth Block 120 and Communication with Communication Adaptor>

Fourth block 120 is a block to establish radio communication with communication adaptor 108. Fourth block 120 uses a specific low power radio communication protocol to establish radio communication with gateway device 106. Fourth block 120 includes a second antenna 107, a transmission signal generation unit 814, a transmission processing unit 815, a reception processing unit 816, and a duplexer 817. Second antenna 107 communicates a radio signal. That radio signal is governed by a predetermined communication protocol transmitted from communication adaptor 108. Second antenna 107 transmits and receives a signal with respect to transmission processing unit 815 or reception processing unit 816 via duplexer 817. Transmission signal generation unit 814 converts the control information from control unit 113 into a control signal for transmission to communication adapter 108, and supplies the converted signal to transmission processing unit 815. By the process of modulating and/or amplifying the control signal, transmission processing unit 815 forms a control signal in the format that is to be actually transmitted. Transmission processing unit 815 transmits the control information to communication adaptor 108 via duplexer 817 and second antenna 107. Reception processing unit 816 carries out a process such as demodulation on the supplied signal. Reception processing unit 816 supplies the signal subjected to demodulation to control unit 113. Duplexer 817 functions to prevent interference between a transmission signal and a reception signal.

[Communication Adaptor 108]

<Configuration of Communication Adaptor 108>

Figure 4:
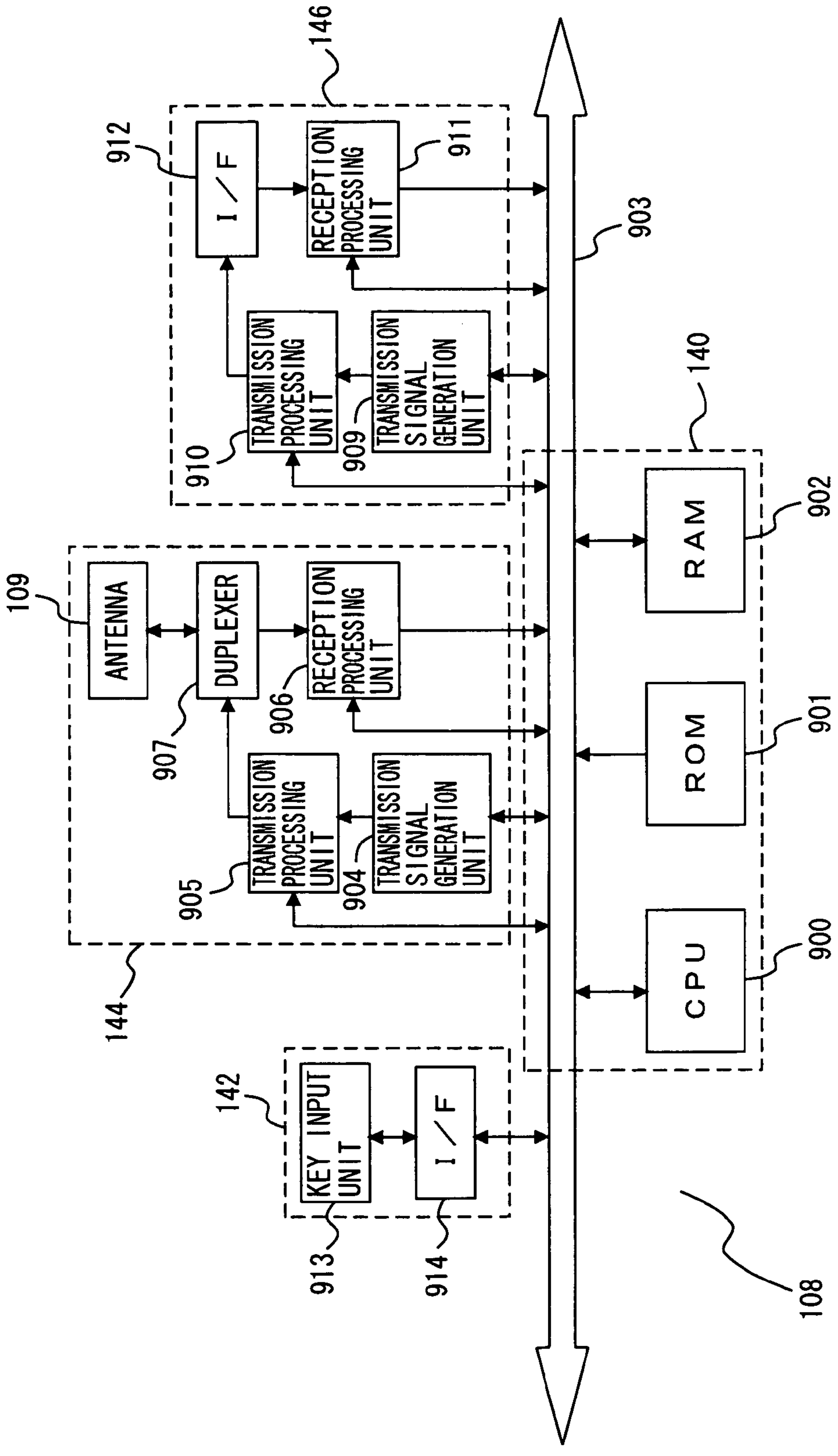
FIG. 4 is a block diagram of a communication adaptor connected to an air conditioner according to an embodiment of the present invention.

Referring to FIG. 4, communication adaptor 108 includes a control unit 140, a first block 142, a second block 144, and a third block 146.

<Configuration of Control Unit 140>

Control unit 140 provides control of various elements in communication adaptor 108. Control unit 113 is a microcomputer including a CPU 900, a ROM 901, and a RAM 902. Control unit 113 is connected via a CPU bus 903.

ROM 901 stores various processing programs executed at control unit 140 of communication adaptor 108, data required for processing, and the like.

RAM 902 is mainly employed as the working area for various processing. As an example, it used as a temporary storage region of data obtained by various processing.

<Configuration of First Block 142>

First block 142 is a block for the user to directly control communication adaptor 108. First block 142 includes a key input unit 913, and an interface 914. Key input unit 913 includes setting keys such as a dip switch. When the user is to use air conditioner 111 with communication adaptor 108 connected, the channel and the like for establishing specific low power radio communication with gateway device 106 are set using the dip switch of key input unit 913.

<Configuration of Second Block 144>

Second block 144 is a block to establish radio communication with gateway device 106. Second block 144 of the present embodiment establishes radio communication using a specific low power radio communication protocol. Second block 144 includes an antenna 109, a transmission signal generation unit 904, a transmission processing unit 905, a reception processing unit 906, and a duplexer 907. Antenna 109 communicates a radio signal to gateway device 106. This radio signal is governed by a predetermined communication protocol. Transmission signal generation unit 904 supplies a signal to transmission processing unit 905. By processing the signal supplied from signal generation unit 904, transmission processing unit 905 generates a signal in the format that is to be actually transmitted. The processing includes modulating and/or amplifying a signal supplied from transmission signal generation unit 904. Transmission processing unit 905 transmits the generated signal to air conditioner 111 via antenna 109 and duplexer 906. Reception processing unit 906 receives a radio signal via duplexer 907. Reception processing unit 906 provides the supplied radio signal to control unit 140. The signal provided to control unit 140 is already subjected to processing such as demodulation. Duplexer 907 functions to prevent interference between a transmission signal and a reception signal.

<Configuration of Third Block 146>

Third block 146 is a block to communicate with air conditioner 111. Air conditioner 111 communicates in serial communication such as of UART (Universal Asynchronous Receiver Transmitter). Third block 146 includes a transmission signal generation unit 909, a transmission processing unit 910, a reception processing unit 911, and an interface 912. Transmission signal generation unit 909 converts transmission information into a transmission signal. The transmission information is output from control unit 140. The transmission signal is transmitted to air conditioner 111. Transmission signal generation unit 909 supplies the signal to transmission processing unit 910. Transmission processing unit 910 provides the transmission signal in the format that is to be actually transmitted to air conditioner 111. The signal is supplied to air conditioner 111 via interface 912 and a terminal 110 for connection with air conditioner 111. A terminal on the part of air conditioner 111 (not shown) connected to terminal 110 functions in a manner similar to that of the well-known infrared light receiver. Transmission processing unit 910 processes the transmission signal supplied from transmission signal generation unit 909 to form a transmission signal in the format that is to be actually transmitted. The contents of processing thereof include modulation, amplification, and the like. Reception processing unit 911 modulates a signal into information through a process such as demodulation.

It is needless to say that the configuration of communication system 100 is not limited to the specific example shown in FIGS. 1-4. An additional function not disclosed in any of FIGS. 1-4 may be included, and not all the functions disclosed in FIGS. 1-4 have to be included. For example, the appliance communicating with gateway device 106 is not limited to only an air conditioner 111. The appliance communicating with gateway apparatus 106 may be a plurality of air conditioners. Further, the appliance communicating with gateway device 106 may be a plurality of appliances of different types.

<<Operation of Each Device (Flow Chart)>>

[Remote-control Device 104]

<Transmission Process>

Figure 5:
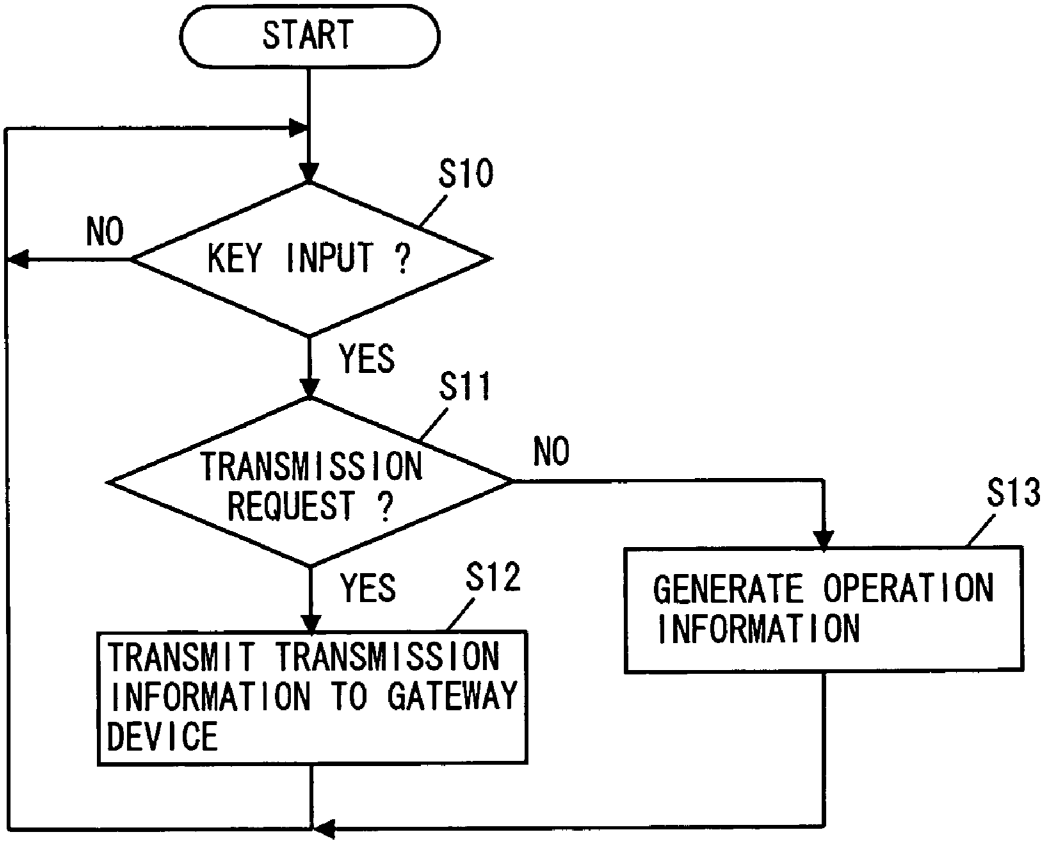
FIG. 5 is a flow chart of the control procedure of the process of transmitting transmission information to a gateway device according to an embodiment of the present invention.

Referring to FIG. 5, the program executed by remote-control device 104 includes a control configuration set forth below, in association with the process of transmitting transmission information to gateway device 106.

At step (hereinafter, step abbreviated as S) 10, CPU 200 waits for an input from key input unit 103 upon being powered on. At S11, CPU 200 determines whether the key input from the user is a transmission request to gateway device 106. In the present embodiment, CPU 200 determines whether the key input corresponds to a transmission request or not based on whether the decision key transmission button in key input unit 103 is depressed or not. Upon determination of the key input corresponding to a transmission request (YES at S11), control proceeds to S12, otherwise (NO at S11), control proceeds to S13.

Figure 6:
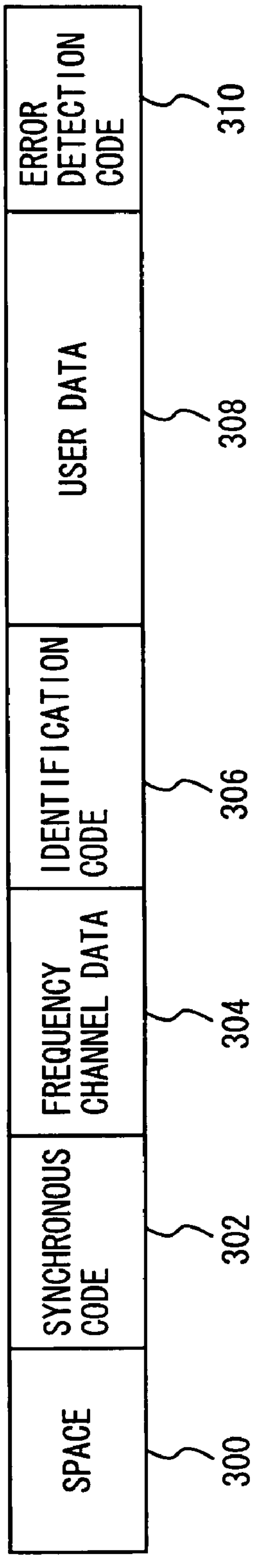
FIG. 6 represents the format of a packet transmitted between the remote-control device and gateway device according to the present embodiment.
Figure 20:
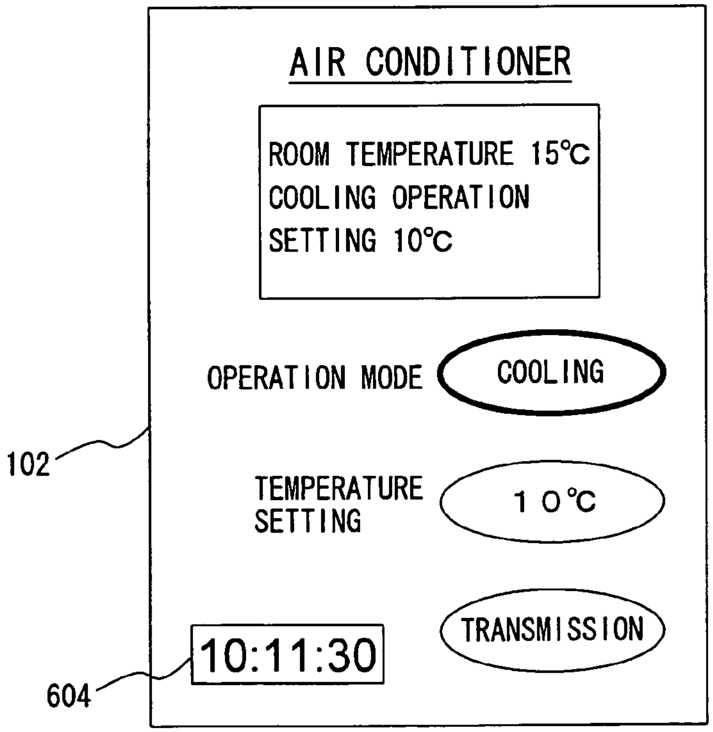
FIG. 20 is a diagram to describe a screen to monitor the operation of an air conditioner application in a remote-control device according to an embodiment of the present invention.
Figure 21:
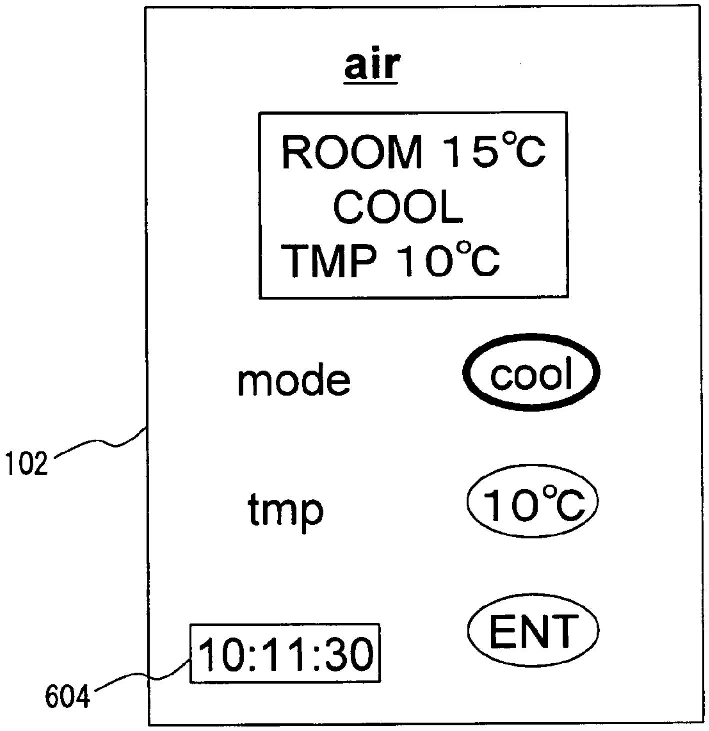
FIG. 21 is a diagram to describe that the screen configuration can be modified according to the user at the screen to monitor the operation of the air conditioner application in the remote control device according to an embodiment of the present invention.

At S12, CPU 200 supplies the control apparatus ID stored in ROM 201, the user ID stored in RAM 202, and the operation information input through an operation by the user at the operation screen of FIG. 20 as instruction information to transmission signal generation signal unit 214. Instruction information is one type of transmission information. Transmission signal generation unit 214 converts the transmission information from control unit 150 into transmission signals for transmission to gateway device 106, and provides these signals to transmission processing unit 213. Transmission processing unit 213 conducts processing such as modulation and amplification of the supplied transmission signals to form transmission signals in the format that is to be actually transmitted, and transmits these signals through radio to gateway device 106 via duplexer 210 and communication antenna 101. Referring to FIG. 6, the format of a packet communicated between remote-control device 104 and gateway device 106 according to the present embodiment will be described hereinafter. The packet includes a space area 300, a synchronous code area 302, a frequency channel data area 304, an identification code area 306, a user data area 308, and an error detection code area 310. Space area 300 represents the so-called blank area. Synchronous code area 302 includes the synchronous code. Frequency channel data area 304 includes data representing the frequency channel. Identification code area 306 includes data representing identification codes. User data area 308 includes user data. In the present embodiment, the user ID, control apparatus ID, and operation information representing the control contents of an appliance is included. "Information identifying an appliance" to select the foregoing control application is included here. In the present embodiment, the information is a numeric identifying an appliance, stored in RAM 202 of remote-control device 104 and flash memory 803 of gateway device 106. In the present embodiment, values input by the user are employed for these values. Error detection code area 310 includes the so-called error detection code. Determination is made whether data has been transmitted properly or not based on this data.

At S13, CPU 200 stores the operation information input via key input unit 103 into RAM 202. CPU 200 generates display information from that information.

<Display Process>

Figure 7:
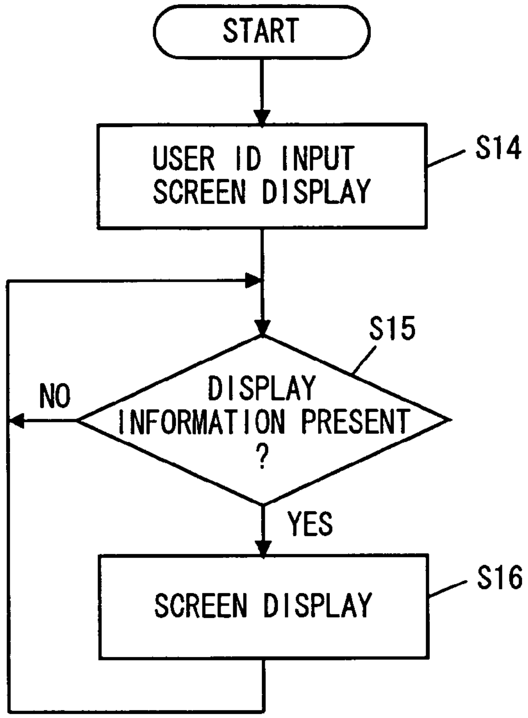
FIG. 7 is a flow chart of the control procedure of the display process of displaying display information at an LCD according to an embodiment of the present invention.

Referring to FIG. 7, the program executed at remote-control device 104 includes a control configuration set forth below, in association with a display process for displaying the display information at LCD 102 subsequent to power-on of remote-control device 104.

When remote-control device 104 is turned on at S14, CPU 200 reads out the activation program from ROM 201, and executes that activation program. CPU 200 provides to display information processing unit 207 the information of a screen to enter a user ID. Display information processing unit 207 forms a display signal from this information. Display information processing unit 207 supplies this signal to LCD 102.

At S15, CPU 200 waits for input of display information. In the present embodiment, CPU 200 assumes that display information has been input when data is written into a certain region for display information. This certain region is included in RAM 202.

At S16, CPU 200 supplies the input display information to display information processing unit 207. Display information processing unit 207 supplies a display signal to LCD 102 based on this information. LCD 102 provides an image display. In the case where the display of LCD 102 is to be modified through an instruction by the user, the input from key input unit 103 is supplied to control unit 150 via interface 205. Control unit 150 supplies the display information corresponding to the key input to display information processing unit 207.

<Reception Process>

Figure 8:
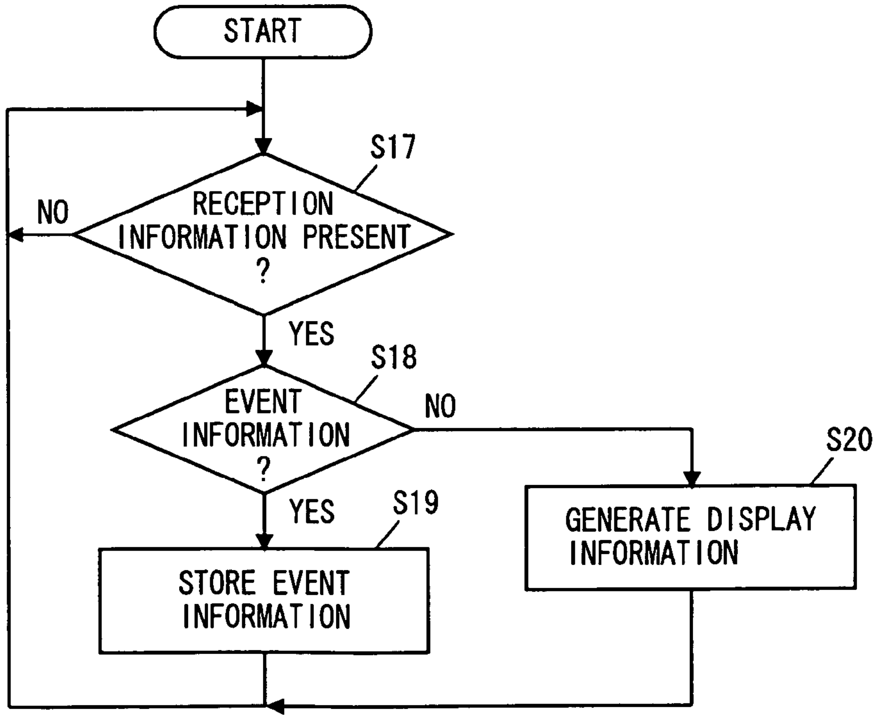
FIG. 8 is a flow chart of the control procedure of a reception process receiving reception information from a gateway device according to an embodiment of the present invention.

Referring to FIG. 8, the program executed by remote-control device 104 includes a control configuration set forth below, in association with a reception process of receiving reception information from gateway device 106 subsequent to power-on of remote-control device 104.

When power is supplied at S17, control unit 150 waits until information from gateway device 106 is received. The radio signal transmitted by gateway device 106 is received by communication antenna 101 of remote-control device 104. This radio signal is supplied to signal processing unit 211 through duplexer 210. Reception processing unit 211 carries out the process of demodulating a supplied signal and the like. The signal subjected to demodulation is supplied to decode unit 212. Display information to operate application software, event information, and the like are transmitted from gateway device 106. Decode unit 212 supplies the signal demodulated at reception processing unit 211 to control unit 150. The signal is restored to the former information according to respective data formats prior to supply to control unit 150.

At S18, CPU 200 determines whether the received information is event information or not. When determination is made of the received information being event information (YES at S18), control proceeds to S19, otherwise (NO at S18), control proceeds to S20. At S19, CPU 200 stores the event information in RAM 202. At S20, CPU 200 generates display information.

[Gateway Device 106]

<Reception Process>

Figure 9:
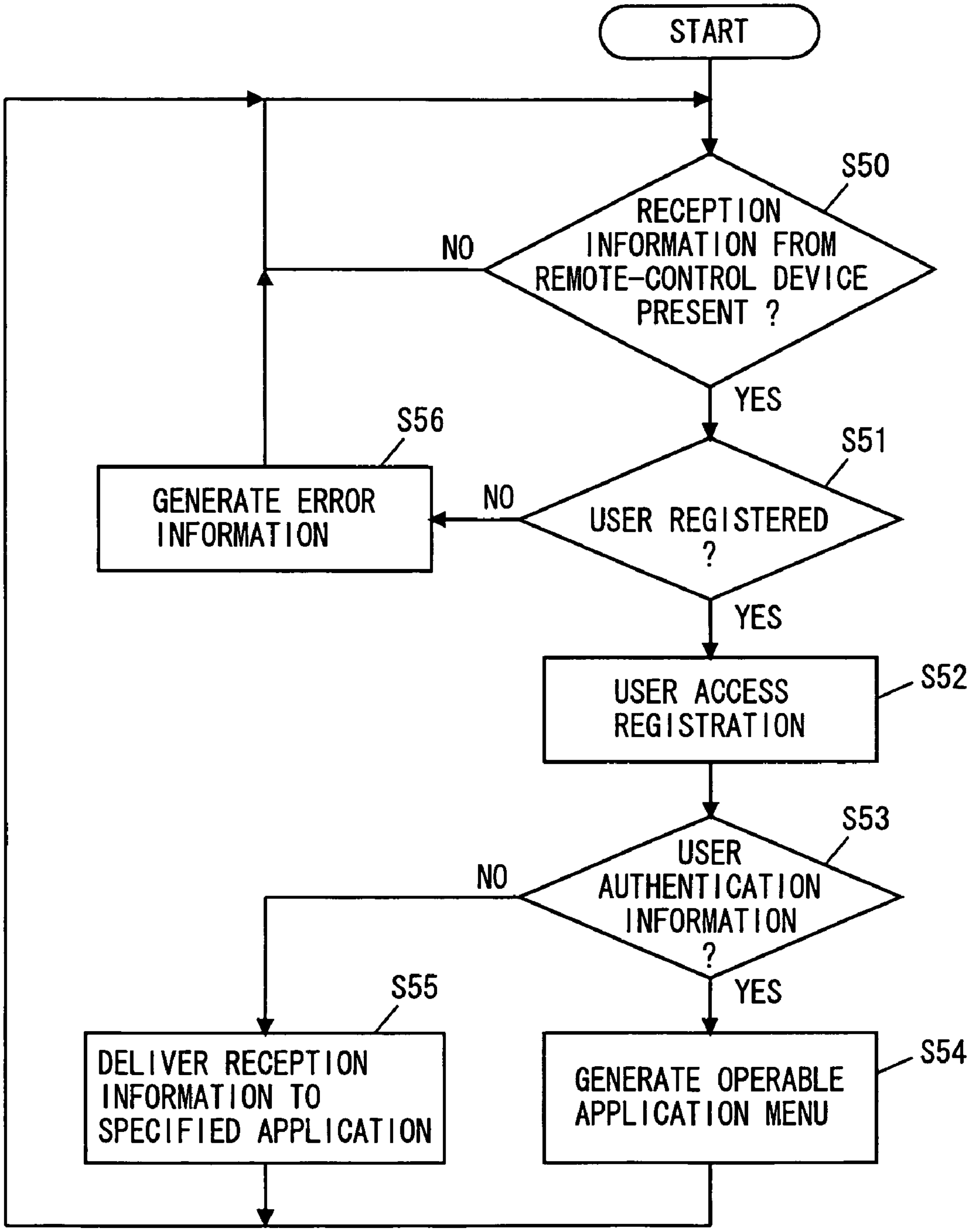
FIG. 9 is a flow chart of the control procedure of a process of receiving reception information from a remote-control device according to an embodiment of the present invention.

Referring to FIG. 9, the program executed at gateway device 106 includes a control configuration set forth below, in association with the process of receiving reception information from remote-control device 104.

At S50, CPU 800 carries out a log-in process with remote-control device 104. CPU 800 waits for reception of reception information from remote-control device 104. The radio signal representing reception information, transmitted from remote-control device 104, is received through first antenna 105 of gateway device 106. The received radio signal is supplied to reception processing unit 811 via duplexer 812. Reception processing unit 811 carries out the process of demodulating the supplied signal and the like to provide the signal subjected to the demodulation to CPU 800. When there is no reception for a predetermined period of time, CPU 800 carries out a log-off process with remote-control device 104. Subsequent to log-off, CPU 800 carries out a log-in process at predetermined cases. Predetermined cases include the case of receiving information representing log-in from remote-control device 104. It is postulated that CPU 800 is currently executing the activation program. CPU 800 can execute the activation program by reading out the activation program from ROM 801. CPU 800 can read out the activation program when gateway device 106 is turned on.

At S51, CPU 800 determines whether the user ID is registered or not. This user ID is included in the reception information received from remote-control device 104. Whether the user ID is registered or not can be identified by searching through the user authentication database. The user authentication database is stored in flash memory 803. When determination is made that the user ID is registered (YES at S51), control proceeds to S52, otherwise (NO at S51), control proceeds to S56.

At S52, CPU 800 registers the user ID and control apparatus ID at the user access database stored in flash memory 803. CPU 800 sets in correspondence the user with the received user ID and remote-control device 104 with the received control apparatus ID. In the present embodiment, such correspondence is established by registering data representing the relationship between a user ID and control apparatus ID at the user access database. Thus, the user with the relevant user ID can be clearly identified as the one using remote-control device 104 with the relevant control apparatus ID.

At S53, CPU 800 determines whether the reception information includes user authentication information or not. The user authentication information is indicative of user authentication being requested. The user authentication information includes a user ID and control apparatus ID. When determination is made that the received reception information includes user authentication information (YES at S53), control proceeds to S54, otherwise (NO at S53), control proceeds to S55.

At S54, CPU 800 searches for information representing an application that can be used by the user with the received user ID from the user authentication database. CPU 800 searches for that information based on the received user ID. CPU 800 generates application information representing the application that can be used by that user. CPU 800 provides that application information to transmission signal generation unit 809.

At S55, CPU 800 determines whether the received reception information is operation information required to operate an appliance. CPU 800 stores the operation information in RAM 802. The operation information includes information to identify the appliance that is the subject of control. CPU 800 can control a certain appliance based on that information. In the present embodiment, that appliance is air conditioner 111.

At S56, CPU 800 identifies the transmission source of the reception information. The transmission source is identified from the control apparatus ID included in the reception information. CPU 800 generates error information for remote-control device 104 of the transmission source. The contents of error information are representative of the user ID not being registered and refusing acceptance of the appliance operation. The error information is displayed at LCD 102 of remote-control device 104. CPU 800 supplies the error information to transmission signal generation unit 809.

<Process of Air Conditioner Application>

Figure 10:
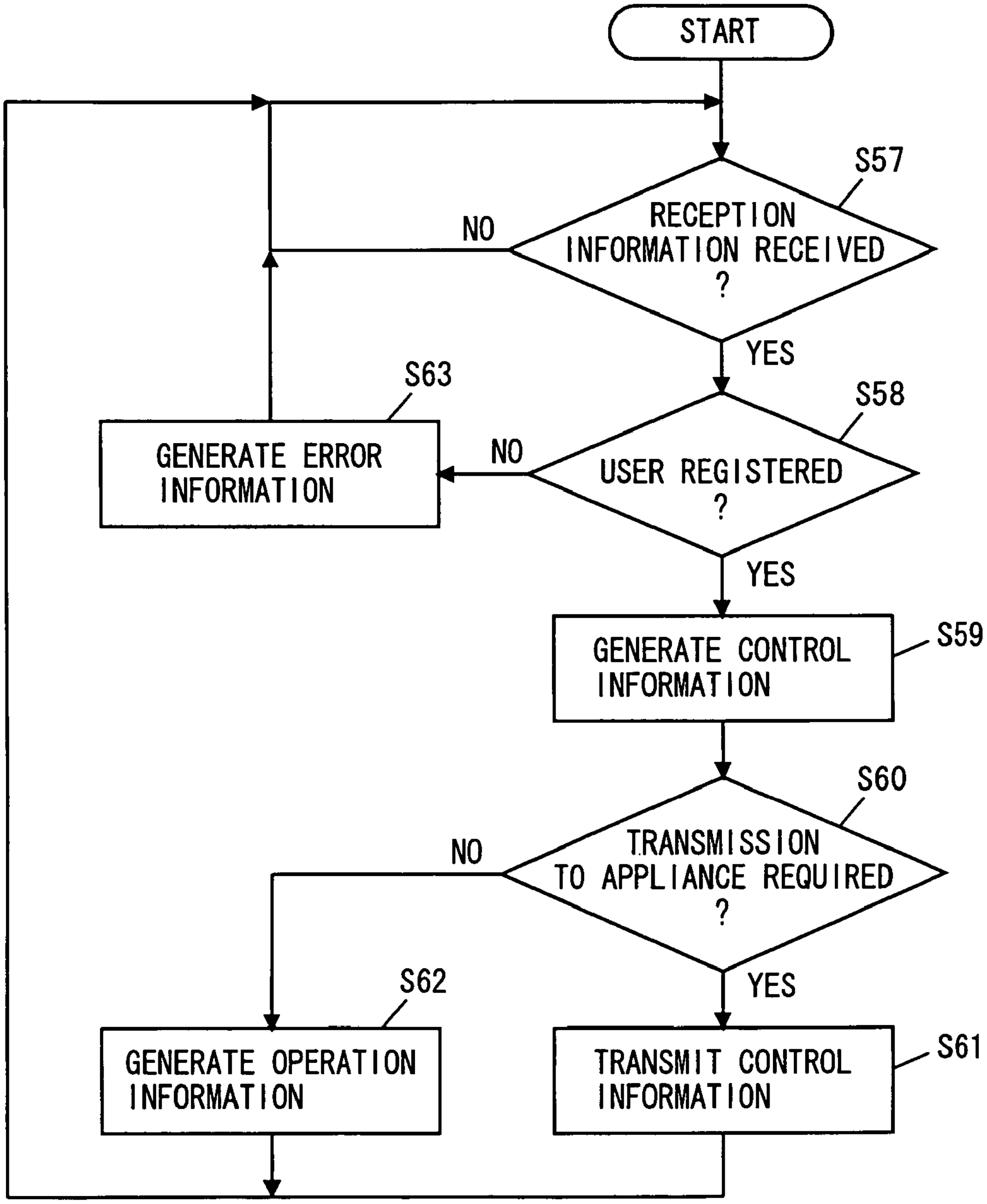
FIG. 10 is a flow chart of the control procedure of a process of an air conditioner application for controlling an air conditioner according to an embodiment of the present invention.
Figure 11:
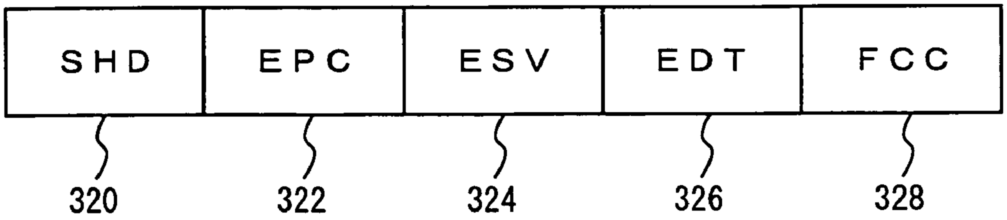
FIG. 11 represents a format of a packet transmitted between a communication adaptor and air conditioner according to the present embodiment.

Referring to FIG. 10, the program executed by gateway device 106 includes a control configuration set forth below, in association with the operation of an air conditioner application directed to controlling air conditioner 111.

At S57, CPU 800 waits until reception information is received from any of remote-control device 104 and communication adaptor 108, based on the activated application.

At S58, CPU 800 determines whether the user with the received user ID can operate air conditioner 111 or not. This determination is based on the information included in the user authentication database. CPU 800 searches for that information in the user authentication database based on the user ID. When determination is made that the user can operate air conditioner 111 (YES at S58), control proceeds to S59, otherwise (NO at S58), control proceeds to S63. At S59, CPU 800 generates control information directed to controlling air conditioner 111 based on the operation information included in the reception information.

At S60, CPU 800 determines whether the generated control information is the control information of the air conditioner main unit. "Whether control information of the air conditioner main unit" refers to whether it is information to be transmitted to air conditioner 111 or not. When determination is made that the control information is directed to the air conditioner main unit (YES at S60), control proceeds to S61, otherwise (NO at S60), control proceeds to S62.

At S61, CPU 800 stores the user ID, control apparatus ID, and the control information included in the reception information to RAM 802 as transmission data. This process is directed to identifying which user and which control information it corresponds to, when information is received from air conditioner 111. CPU 800 supplies the control information to transmission signal generation unit 814. Transmission signal generation unit 814 converts the control information from control unit 113 into a control signal for transmission to communication adaptor 108, and supplies the converted control signal to transmission processing unit 815. Transmission processing unit 815 forms a control signal in the format that is to be actually transmitted by applying processing such as modulating and/or amplifying the control signal. Transmission processing unit 815 transmits the control information to communication adaptor 108 via duplexer 817 and second antenna 107. The control information is supplied to air conditioner 111 via communication adaptor 108.

At S62, CPU 800 controls respective elements of gateway device 106 based on the control information. CPU 800 generates display information representing the result of control based on the control results. CPU 800 generates display information corresponding to the user. In the present embodiment, the display information can be generated based on the information included in the user customized database of the air conditioner application. CPU 800 searches for that information from the user customized database based on the user ID. The user customized database is stored in flash memory 803. CPU 800 customizes the display information in conformance with the performance of remote-control device 104 of the transmission destination. The transmission destination is identified based on the information included in the remote-control device database. CPU 800 searches for that information in the remote-control device database. CPU 800 supplies the customized information to transmission signal generation unit 809.

At S63, CPU 800 identifies the transmission source of the reception information. The transmission source is identified by the control apparatus ID in the reception information. CPU 800 generates error information for remote-control device 104 of the transmission source. The error information includes the contents of displaying a message that air conditioner 111 cannot be used at the LCD of remote-control device 104. CPU 800 supplies the error information to transmission signal generation unit 809.

Figure 12:
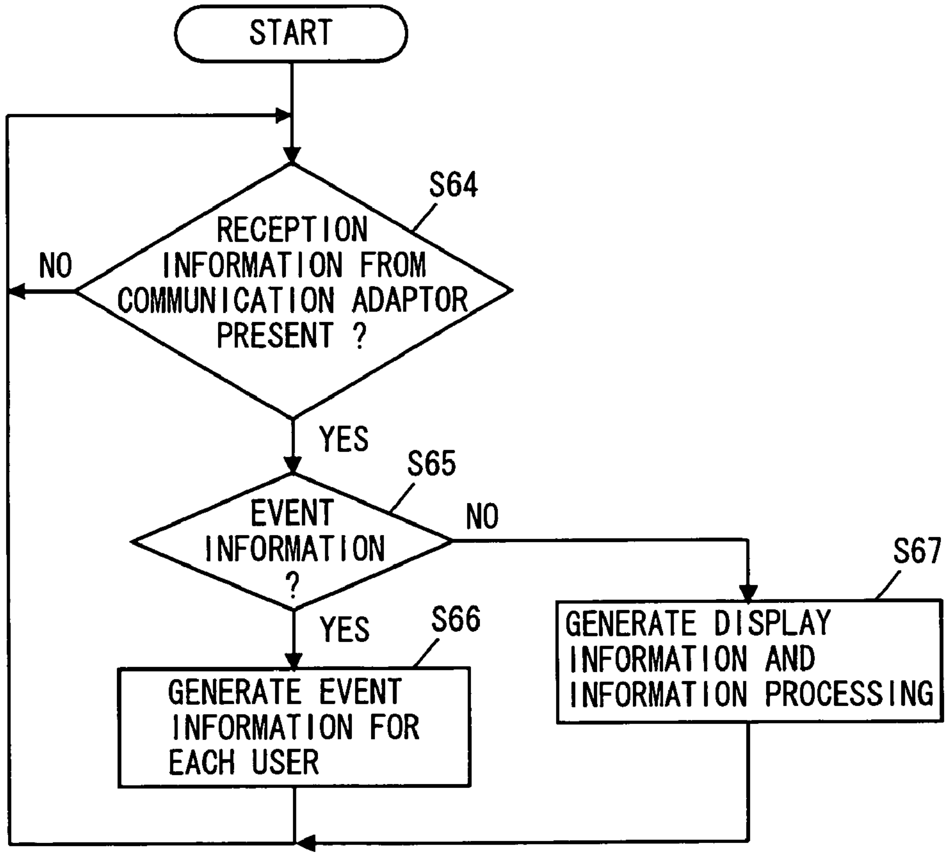
FIG. 12 is a flow chart of the control procedure of a process of an air conditioner application monitoring an air conditioner according to an embodiment of the present invention.

Referring to FIG. 12, the program executed by gateway device 106 includes a control configuration set forth below, in association with the operation of the air conditioner application for monitoring air conditioner 111.

At S64, CPU 800 reads out and executes each application from flash memory 803. Based on the activated application, CPU 800 waits until reception information is received from communication adaptor 108 connected to air conditioner 111.

At S65, CPU 800 determines whether the reception information is the event information voluntarily issued from air conditioner 111. When determination is made of event information (YES at S65), control proceeds to S66, otherwise (NO at S65), control proceeds to S67.

At S66, CPU 800 searches for the user ID that can operate air conditioner 111 from the user authentication database. CPU 800 further searches through the user access database based on the registered user ID. Based on the searched result, CPU 800 extracts all the user IDs that can use air conditioner 111 and the operating control apparatus IDs that are currently in access with gateway device 106. CPU 800 generates respective event information addressed to remote-control device 804 with the extracted control apparatus ID. CPU 800 supplies the generated event information to transmission signal generation unit 809. The event information includes operation information. This operation information is processed in the stages of the two steps set forth hereinafter. The first step corresponds to generation of operation information according to the user. CPU 800 generates information based on the information included in the user customized database for air conditioner 111. This user customized database is stored in flash memory 803. CPU 800 searches through this user customized database using each user ID. The second step corresponds to generation of operation information in conformance with the performance of remote-control device 104 of the transmission destination. CPU 800 generates information based on the information included in the remote-control device database. This remote-control device database is stored in flash memory 803. CPU 800 searches through this remote-control device database using each control apparatus ID.

At S67, CPU 800 identifies which control information the received information corresponds to. CPU 800 extracts the user ID and control apparatus ID of the transmission destination. CPU 800 supplies the display information generated based on the user ID and control apparatus ID to transmission signal generation unit 809. The display information is processed in the stages of the two steps set forth hereinafter. The first step corresponds to generation of display information according to the user. CPU 800 generates information based on the information included in the user customized database for air conditioner 111. This user customized database is stored in flash memory 803. CPU 800 searches through this user customized database using each user ID. The second step corresponds to generation of display information in conformance with the performance of remote-control device 104 of the transmission destination. CPU 800 generates information based on the information included in the remote-control device database. This remote-control device database is stored in flash memory 803. CPU 800 searches through this remote-control device database using each control apparatus ID. Transmission signal generation unit 809 converts the information generated by CPU 800 into transmission signals to be transmitted to remote-control device 104. The transmission signals are supplied to transmission processing unit 810. Transmission processing unit 810 carries out processing such as modulating and/or amplifying the transmitted signal to form a transmission signal in the format that is to be actually transmitted. Transmission processing unit 810 transmits the transmission signal in the format that is to be actually transmitted through radio communication to remote-control device 104 via duplexer 812 and first antenna 105.

[Communication Adaptor 108]

<Reception Process from Gateway Device 106>

Figure 13:
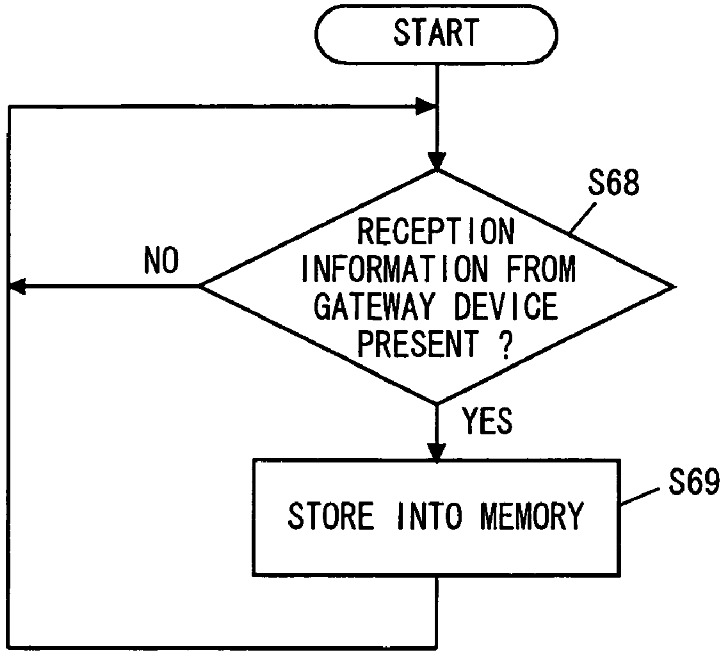
FIG. 13 is a flow chart of the control procedure of a process when reception information is received from a gateway device according to an embodiment of the present invention.

Referring to FIG. 13, the program executed at communication adaptor 108 includes a control configuration set forth below, in association with the process of receiving reception information from gateway apparatus 106 subsequent to power-on of communication adaptor 108.

At S68, CPU 900 reads out the activation program from ROM 901 subsequent to power-on of communication adaptor 108. CPU 900 executes the activation program. CPU 900 waits until reception information is received from gateway device 106. When CPU 900 receives a radio signal from gateway device 106 at S69, data is generated by demodulating the radio signal. The radio signal is transmitted to CPU 900 via reception processing unit 906. CPU 900 converts the communication protocol for gateway device 106 and the communication protocol for the air conditioner with respect to the supplied data. CPU 900 assigns a serial number to the data that has the protocol converted. Accordingly, the received data can be accessed in an ascending order or descending order. CPU 900 stores the data with the serial number in RAM 902.

<Transmission Process Towards Air Conditioner 111>

Figure 14:
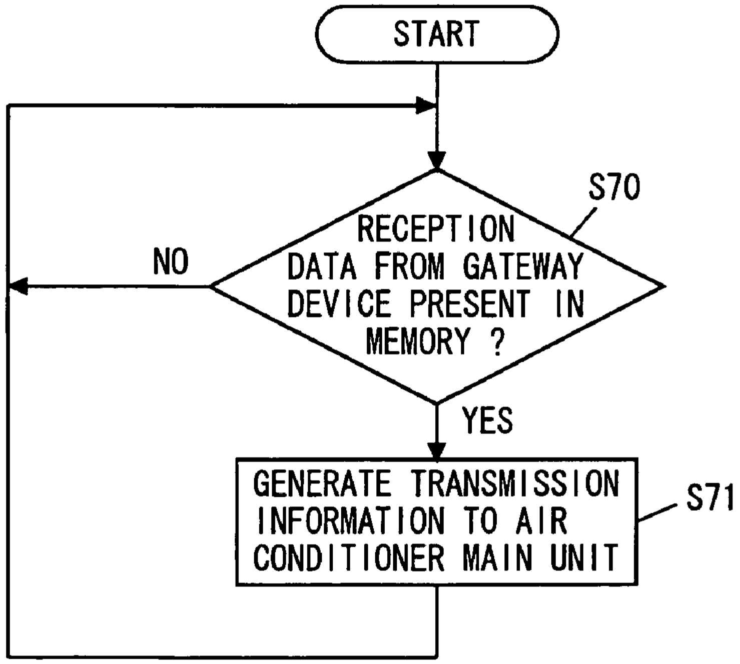
FIG. 14 is a flow chart representing a control procedure of a process when transmission information is transmitted to an air conditioner according to an embodiment of the present invention.

Referring to FIG. 14, the program executed at communication adaptor 108 includes a control configuration set forth below, in association with the process of transmitting transmission information to air conditioner 111.

At S70, CPU 900 prepares for storage of the reception signal from gateway device 106 into RAM 902. At S71, CPU 900 extracts the reception information with the least recent serial number among the reception information from gateway device 106, stored in RAM 902. CPU 900 generates a serial number to be transmitted to air conditioner 111 based on the extracted reception information. The serial signal is supplied to transmission signal generation unit 909. Transmission signal generation unit 904 supplies the serial signal to transmission processing unit 905. Transmission processing unit 905 forms a signal in the format that is to be actually transmitted by a process such as modulating and/or amplifying the serial signal. Transmission processing unit 905 transmits the generated signal to air conditioner 111 via antenna 109 and duplexer 906. The format of a packet communicated between communication adaptor 108 and air conditioner 111 according to the present embodiment will be described hereinafter. This packet includes an SHD area 320, an EPC area 322, an ESV area 324, an EDT area 326, and an FCC area 328. SHD area 320 represents the packet communication direction such as communication from communication adaptor 108 towards air conditioner 111. EPC area 322 includes data representing the property of the packet. For air conditioner 111, the data includes those related to air conditioner control, the state of the air conditioner, notification, and apparatus type information. ESV area 324 includes data representing the character of the packet. EDT area 326 includes data representing the property contents. FCC area 328 includes the so-called error detection code. Determination is made whether data has been transmitted properly or not based on this data.

<Reception Process from Air Conditioner 111>

Figure 15:
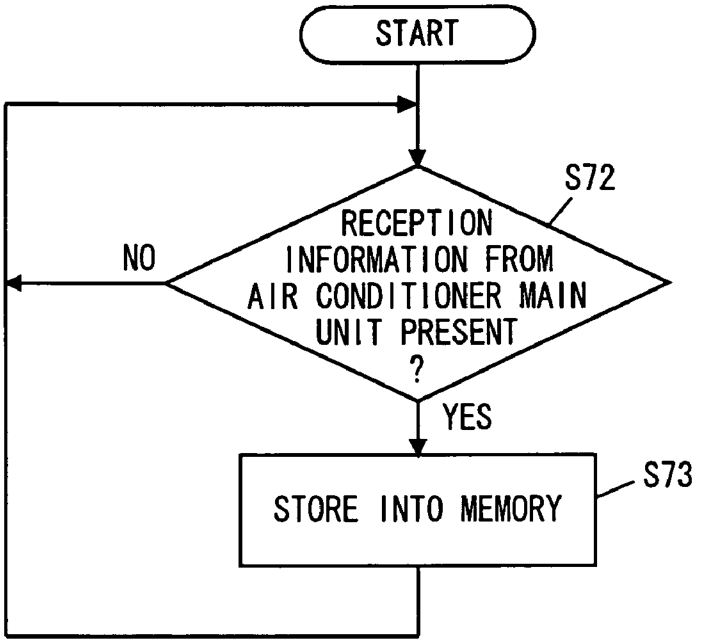
FIG. 15 is a flow chart of a control procedure of a process when reception information is received from an air conditioner according to an embodiment of the present invention.

Referring to FIG. 15, the program executed at communication adaptor 108 includes a control configuration associated with the process when reception information is received from air conditioner 111.

At S72, CPU 900 waits for reception of a serial signal from air conditioner 111. Upon receiving a serial signal from air conditioner 111 at S73, reception processing unit 911 modulates the serial signal into reception information through the process of demodulation and the like. The signal subjected to modulation is supplied to control unit 140. CPU 900 assigns a serial number to the signal subjected to modulation. CPU 900 stores the reception information in RAM 902.

<Transmission Process to Gateway Device 106>

Figure 16:
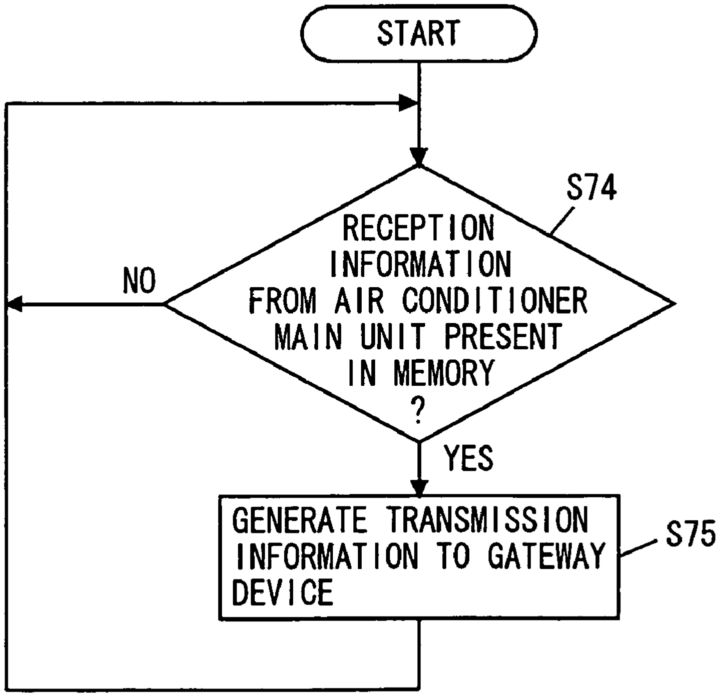
FIG. 16 is a flow chart representing a control procedure of a process when transmission information is transmitted to a gateway device according to an embodiment of the present invention.

Referring to FIG. 16, the program executed at communication adapter 108 includes a control configuration set forth below, in association with the process when transmission information is transmitted to gateway device 106.

At S74, CPU 900 prepares for extracting reception information from air conditioner 111 at RAM 902. At S75, CPU 900 extracts the reception information with the least recent serial number among the received information from air conditioner 111 stored in RAM 902. CPU 900 generates transmission information directed to gateway device 109 based on the extracted reception information. CPU 900 supplies the generated transmission information to transmission signal generation unit 904. Transmission signal generation unit 904 converts the transmission information from CPU 900 into transmission signals for transmission to gateway device 106. Transmission signal generation unit 904 supplies transmission signals to transmission processing unit 905. Transmission processing unit 905 forms signals in the format that is to be actually transmitted through the process of modulating and/or amplifying the transmission signal. Transmission processing unit 905 transmits through radio transmission the generated signal towards gateway device 106 via duplexer 907 and antenna 109.

<<Operation of Communication System 100>>

An operation of communication system 100 will be described based on the structure set forth above and flow charts.

<Operation Related to User Authentication>

The operation when a user enters a user ID will be described with reference to FIGS. 5, 7, 9, 17, 18, and 19.

[Operation of Remote-Control Device 104]

Figure 17:
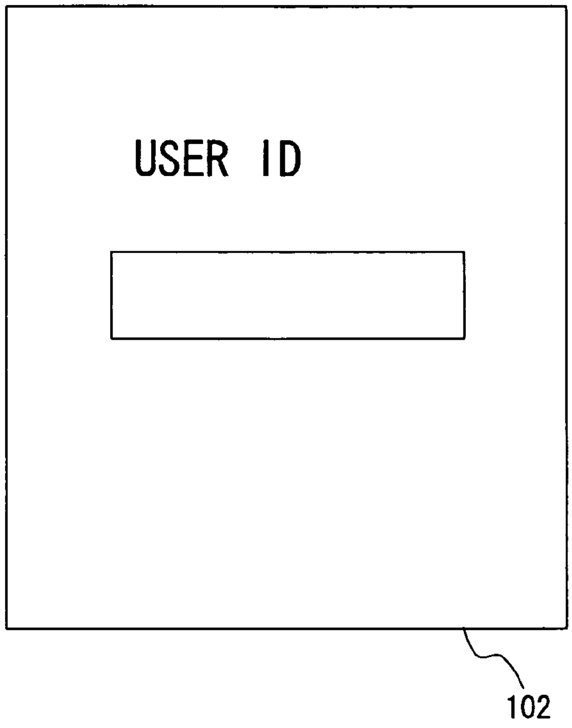
FIG. 17 shows an example of a screen for user authentication displayed at an LCD immediately after the power is turned on in a remote-control device according to an embodiment of the present invention.

Key input unit 103 includes the power on/off switch. When there is an input from this power switch when the power is OFF, the input is supplied to control unit 150 via interface 205. Control unit 150 reads out and executes the activation program from ROM 201. Control unit 150 supplies the information of a screen to input a user ID to display information processing unit 207. Display information processing unit 207 supplies a display signal to LCD 102 based on this information (S14). FIG. 17 shows an example of an input screen displayed at LCD 102. In the screen, the text of "user ID" and an ID number display window are provided.

Figure 18:
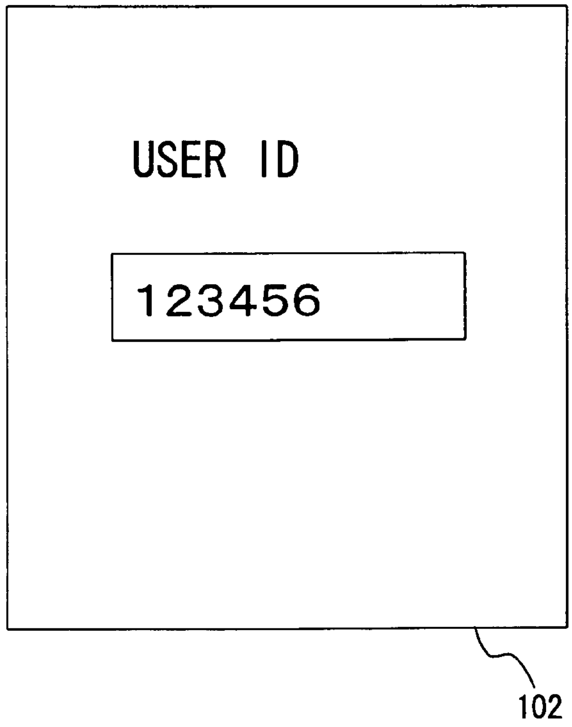
FIG. 18 is a diagram to describe an example of entering a user ID through a key operation by the user at a remote-control device according to an embodiment of the present invention.

When the user operates the ten-key at key input unit 103 to enter an ID number (YES at S10), this input is supplied to control unit 150 via interface 205. Control unit 150 stores the input ID number in RAM 202 (S13). Control unit 150 supplies the display information corresponding to the ten-key to display information processing unit 207. Display information processing unit 207 generates display signals from the display information and supplies the generated display signals to LCD 102 (S16). FIG. 18 shows an example of a registration screen when the user depresses the keys of "1", "2", "3", "4", "5", and "6" of the ten-key.

Key input unit 103 includes a decision key. When the user operates the decision key (YES at S11), control unit 150 transmits the user ID and control apparatus ID to gateway device 106 as the transmission information (S12). Remote-control device 104 has a control apparatus ID unique to that device stored in advance. Thus, user authentication information including a user ID and control apparatus ID is transmitted from remote-control device 104 to gateway device 106.

[Operation of Gateway Device 106]

Figure 19:
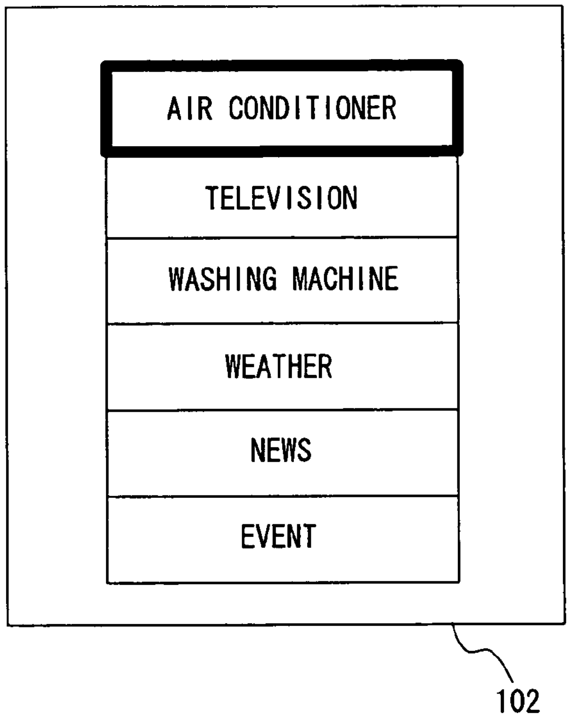
FIG. 19 is a diagram to describe a screen to select an application that can be used by the user in a remote-control device according to an embodiment of the present invention.

When user authentication information is received from remote-control device 104 (YES at S53), control unit 113 searches through the user authentication database based on the user ID included in the information. Control unit 113 extracts application information representing an image of a list of applications that can be used by the user with the user ID transmitted from control remote device 104. Control unit 113 searches through the remote-control device database based on the received control apparatus ID. Based on the searched result, control unit 113 extracts the specification of remote-control device 104 corresponding to the transmission source of the information. Control unit 113 generates transmission information from the application information according to the extracted specification. Control unit 113 supplies the generated transmission information to transmission signal generation unit 809 (S54). Furthermore, control unit 113 updates the user access database using the user ID and control apparatus ID included in the received user authentication information. Upon transmission of the application display information to remote-control device 104 by gateway device 106, a screen for selecting an operable application is displayed at LCD 102. FIG. 19 shows an example of LCD 102 in such a case.

<Operation Associated with Application Selection>

An operation of selecting an application by the user will be described with reference to FIGS. 5, 7 and 19.

[Operation of Remote-Control Device 104]

Since information of an application of which usage is permitted, determined based on the transmitted user ID and control apparatus ID, is output from gateway device 106 (YES at SI5), control unit 150 of remote-control device 104 receives this information. In the present embodiment, that information is written in the description language of xml (Extensible Markup Language). Control unit 150 supplies that information to display information processing unit 207. Display information processing unit 207 forms display signals from the display information, and supplies the display signals to LCD 102. Accordingly, display information transmitted from gateway device 106 in radio signals appears at the display screen of LCD 102 (S16). FIG. 19 shows an example of the display of LCD 102 in such a case. The application executed on the currently operable gateway device includes an air conditioner application, television application, washing machine application, weather application, and news application. LCD 102 shows the labels of these applications, divided in rectangular frames. The reason why the news application is displayed is that, when display signals are transmitted to LCD 102, control unit 150 supplies to display information processing unit 207 the information to operate the event information stored in RAM 202. In LCD 102 of FIG. 19, the frame corresponding to the air conditioner is in highlight. When the user operates the crisscross arrow key of key input unit 103 while referring to the menu (YES at S10), the input operation is supplied to control unit 150 via interface 205. Control unit 150 supplies display information corresponding to the key input to display information processing unit 207. The highlight of the rectangular frame is shifted to another frame according to the operation. Such control is effected by supplying the display information generated by an input through key input unit 103 to display information processing unit 207 by control unit 150. When the decision key at the input unit is operated when the frame of the air conditioner is highlighted on LCD 102 (YES at S11), control unit 150 generates and supplies to transmission signal generation unit 214 the transmission information. Transmission signal generation unit 214 converts the transmission information from control unit 150 into transmission signals for transmission to gateway device 106. The transmission signals are supplied to transmission processing unit 213. Transmission processing unit 213 forms transmission signals in the format that is to be actually transmitted through a process such as modulating and/or amplifying the supplied transmission signals. The generated transmission signals are transmitted in radio communication towards gateway device 106 via communication antenna 101 (S12). When the transmission information is to be transmitted to gateway device 106, the user ID input by the user and the control apparatus ID stored in ROM 201 of remote-control device 104 are transmitted, included in the transmission information, as will be described afterwards. Gateway device 106 can identify which remote-control device 104 is operated by what user through these IDs. In this case, control unit 150 transmits to gateway device 106 the information indicative of the air conditioner application being selected (S12).

[Operation of Gateway Device 106]

When the control apparatus ID and user ID are received from remote-control device 104 through the process of steps S50-S52 (YES at S53), control unit 113 selects an application that can be used. The appropriate application is selected by referring to the database. Control unit 113 transmits the application information to operate the application to remote-control device 104 (S54).

<Operation in the Event of Operating Air Conditioner 111>

An operation of manipulating an air conditioner by the user will be described hereinafter with reference to FIGS. 5, 9, 10, 20 and 21.

[Operation of Remote-Control Device 104]

CPU 800 of gateway device 106 that executes the air conditioner application receives information (NO at S53) indicative of the air conditioner application being selected from remote-control device 104 (in the present embodiment, this information is one type of operation information), and transmits information representing a menu to operate the air conditioner application to remote-control device 104 (S55). CPU 200 of remote-control device 104 generates the display information (S20). An example of a display screen at LCD 102 displayed in response to control unit 150 supplying the display information to display information processing unit 207, from the information to operate the air conditioner application, received from gateway device 106, will be described hereinafter with reference to FIG. 20. The text of a "button" appears at the right side of the text of "OPERATION MODE". The "button" currently shows "COOLING". This "button" is displayed in a bold frame. This implies the current selection of that button. By operating the crisscross arrow key at key input unit 103 in the horizontal direction, the user can select an appropriate operation mode such as "cooling", "heating", "dehumidify, and the like. A similar "button" is displayed at the right side to the text of "TEMPERATURE SETTING". The "button" can be selected by operating the crisscross arrow key in the vertical direction. The temperature setting can be set in the step of 1° C. by operating the crisscross arrow key horizontally. When the decision key at key input unit 103 is operated when a button displaying "TRANSMISSION" is selected (YES at S11), CPU 200 transmits the instruction information to gateway device 106 (S12).

The information transmitted from gateway device 106 is displayed at the upper region frame on the display screen of LCD 102. It is shown that the temperature sensor of air conditioner 111 is currently sensing 15° C. Further, it is also shown that air conditioner 111 is in a cooling operation mode with the temperature setting of 10° C. The time display frame 904 located at the left and lower region of the display screen represents the time (10 o'clock; 11 minutes; 30 seconds) corresponding to the time when gateway device 106 has generated the information to operate the air conditioner application. By confirming the time, the user can recognize the operating state of air conditioner 111 even when he/she is located at a site where air conditioner 111 cannot be viewed directly. An operation to realize such display will be described afterwards.

[Operation of Gateway Device 106]

(In the Event of Transmitting Control Information to Communication Adaptor 108)

When LCD 102 provides a display screen as shown in FIG. 20, for example, at remote-control device 104, selection of the "TRANSMISSION" button by operating the cursor key, followed by operation of the decision key (YES at S11), as described in the operation of remote-control device 104, will cause information to be transmitted from remote-control device 104 to gateway device 106 (S12). The reception information from remote-control device 104 always includes a user ID and control apparatus ID. Upon reception of the instruction information (YES at S57), control unit 113 executing the air conditioner application searches through the user authentication database stored in flash memory 803. CPU 800 of control unit 113 confirms that the user ID included in the instruction information is registered as the user ID of the user that can use an air conditioner application through such a search (YES at S58). Upon such confirmation, CPU 800 generates control information directed to controlling air conditioner 111 based on the operation information included in the instruction information (S59). It is assumed that the received information is control information indicative of raising the temperature setting of air conditioner 111 by 1° C. CPU 800 carries out in advance information processing even in the case where control information is to be transmitted to air conditioner 111. By such information processing, the contents of the control information will directly or approximately correspond to the operation of air conditioner 111. By conducting information processing in advance, high-level control is allowed without the need to incorporate a high-level control system in an appliance such as air conditioner 111. Upon generation of control information, CPU 800 determines whether the generated control information is to be transmitted to air conditioner 111 or not (S60). When determination is made that the information is to be transmitted to air conditioner 111 (YES at S60), CPU 800 supplies the control information to transmission signal processing unit 809 (S61).

(In the Event of Not Transmitting Control Information to Communication Adaptor 108)

Confirmation is made whether the received user ID is registered as the user ID of a user that can use the air conditioner application (YES at S58). Upon such confirmation, CPU 800 generates control information directed to controlling air conditioner 111 from the operation information included in the reception information (S59). CPU 800 identifies which control information the received information corresponds to by a search. Upon identification of the control information, CPU 800 carries out image processing corresponding to that control information. It is now assumed that the received information is control information indicative of requesting presentation of the accumulated amount of power consumption by air conditioner 111. In the present embodiment, the accumulated power consumption of the air conditioner can be presented in accordance with the air conditioner application. Air conditioner 111 can measure the instantaneous power consumption amount. CPU 800 executing the air conditioner application caused the air conditioner to periodically measure the power consumption of the air conditioner main unit. CPU 800 receives the result thereof. The data representing the result is stored in flash memory 803. CPU 800 can meet the request by fetching the power consumption amount that has been periodically stored from flash memory 803 and calculate the total.

Upon generation of control information, CPU 800 determines whether the generated control information is information to be transmitted to air conditioner 111 or not (S60). When determination is made that the information is not to be transmitted to air conditioner 111 (NO at S60), CPU 800 generates display information representing the control result (S62). The display information is customized corresponding to the user. The display information is customized based on the information included in the user customized database of the air conditioner application. CPU 800 further customizes the display information according to the specification of remote-control display 104. The information representing the specification is included in the remote-control device database. This information is extracted by searching through the remote-control device database based on the received control apparatus ID. CPU 800 generates transmission information from the customized display information.

(In the Event of Transmitting Information Received from Communication Adaptor 108)

An operation of realizing the display shown in FIG. 20 will be described hereinafter. This is allowed by receiving information from communication adaptor 108 at gateway device 106. When information is received from communication adaptor 108 (YES at S64) and determination is made that the information is not event information (NO at S65), CPU 800 identifies which control information that information corresponds to. In the present embodiment, that information is the setting information representing the setting at the current stage, transmitted from air conditioner 111. CPU 800 extracts the user ID and control apparatus ID of the transmission destination. CPU 800 searches through the user customized database for air conditioner 111 stored in flash memory 803 by a user ID. CPU 800 generates display information according to the user from the setting information. CPU 800 searches through the remote-control device database by a control apparatus ID. CPU 800 supplies the display information to transmission signal generation unit 809 (S67). Display information is processed in conformance with the performance of remote-control device 104 of the transmission destination. By receiving this information at remote-control device 104, a display, as shown in FIG. 20, is allowed. A different screen can be displayed according to the transmission destination, besides that of FIG. 20. Another example of a display screen at LCD 102, based on the transmission information transmitted to remote-control device 104, will be described with reference to FIG. 21.

[Operation of Communication Adaptor 108]

An operation of communication adaptor 108 in the event of transmitting the data received from gateway device 106 as a serial signal to air conditioner 111 will be described hereinafter.

Upon reception of a radio signal from reception processing unit 906 (YES at S68), CPU 900 demodulates the radio signal to generate data. CPU 900 assigns a serial number to the generated data. Accordingly, the received data can be accessed in the ascending order or descending order of input. CPU 900 stores the data with the serial number in RAM 902 (S69). CPU 900 converts the data into signals when there is data with a serial number assigned in RAM 902 (YES at S70). CPU 900 transmits the data in the form of signals (S71). Air conditioner 111 operates based on the transmitted data.

<Operation of Collecting and Administering Event>

An operation of manipulating the air conditioner by the user will be described hereinafter with reference to FIGS. 8, 12, 15, 16, 19, 20 and 22.

[Operation of Communication Adaptor 108]

An operation of communication adaptor 108 in the event of transmitting the data as signals to gateway apparatus 106 from air conditioner 111 will be described hereinafter.

When the internal information has changed or when there is a request from gateway device 106, air conditioner 111 notifies gateway device 106 of event information under the control of air conditioner application. Change in the internal information includes the case where the power of air conditioner 111, for example, is turned on. Air conditioner 111 notifies the event information using a serial signal. The serial signal from air conditioner 111 is supplied to reception processing unit 911 via interface 912 (S72). CPU 900 stores the supplied data in RAM 902. CPU 900 sets a serial number in correspondence with the stored reception information (S73). Accordingly, the received data can be accessed in an ascending order or descending order of input.

When reception information is stored in RAM 902 (YES at S74), CPU 900 sequentially gains access to the information from the least recent one. CPU 900 generates transmission information for transmission to gateway device 102 based on the accessesed reception information. The transmission information is supplied to transmission signal generation unit 904. Transmission signal generation unit 904 converts the transmission signal from CPU 900 into transmission signals for transmission to gateway device 106. Transmission signal generation circuit 904 supplies the transmission signal to transmission processing unit 905. Transmission processing unit 905 applies a process such as modulating and/or amplifying the transmission signal to form a signal in the format that is to be actually transmitted. Transmission processing unit 905 transmits through radio communication the generated signal to gateway device 106 via duplexer 907 and antenna 109 (S75).

[Operation of Gateway Device 106]

(In the Event of Air Conditioner Application)

The process of CPU 800 using the air conditioner application for air conditioner 111 in the event of receiving information from communication adaptor 108 will be described hereinafter.

Upon receiving reception information from communication adaptor 108 (YES at S64), CPU 800 determines whether the reception information is event information or not (S65). When determination is made of event information (YES at S65), CPU 800 searches for the user ID that is allowed to use the air conditioner application from the user authentication database stored in RAM 802. Control unit 113 generates event information only for remote-control device 104 that is required to be transmitted. The control device ID or user ID of remote-control device 104 that is to be transmitted is identified by searching through the application database. CPU 800 searches for the user ID and control apparatus ID from the user access database stored in RAM 802. All the user IDs of users that can use the air conditioner application among those currently in access with gateway device 106 as well as the control apparatus IDs of operating remote-control device 104 are extracted. CPU 800 generates respective event information addressed to remote-control device 104 with such control apparatus IDs. CPU 800 supplies the generated event information to transmission signal generation unit 809 (S66). At this stage, CPU 800 searches through the user customized database for air conditioner 111 stored in flash memory 803. CPU 800 generates the display information in accordance with the user. CPU 800 searches through the remote-control device database. CPU 800 generates display information representing the event information by processing the display information in conformance with the performance of remote display device 104 of the transmission destination.

(In the Event of News Application)

There is the case where control unit 113 transmits the event information to remote-control device 104 based on the algorithm of respective executed applications. For example, control unit 113 executing a news application transmits the event information to remote control device 104 that is operated by the user upon receiving the latest news. The purpose of this operation is to notify the news to the user. The news application is executed by control unit 113 in order to establish communication with the service provider that presents the news on the Internet through a telephone line.

Control unit 113 executing the news application searches through the user authentication database stored in flash memory 803 based on the application ID of the news application to extract the user ID that is permitted of usage. Based on this user ID, the user access database is searched through to extract a control apparatus ID. Thus, the news application extracts the control apparatus ID of remote-control device 104 operated by the user that is permitted of usage of the application. Control unit 113 generates event information based on this control apparatus ID. Control unit 113 supplies the generated event information to the transmission signal generation unit.

[Operation of Remote-Control Device 104]

Based on respective applications executed on gateway device 106, event information is transmitted to remote-control device 104 (S17). Upon reception of the event information at remote-control device 104 (YES at S18), control unit 150 stores the event information into RAM 202 (S19). In the present embodiment, remote-control device 104 receives the event information of "The room temperature has reached the temperature setting of 15° C." at 10:10 based on the air conditioner application, the event information of "Mail from father" at 10:03 based on the mail application, the event information of "Rinsing will end in 10 minutes" at 9:56 based on the washing machine application, and the event information of "XXX news" indicating the presence of recent news at 9:30 based on the XXX news application.

<In the Event of Displaying Event Information>

[Operation of Remote-Control Device 104]

Figure 22:
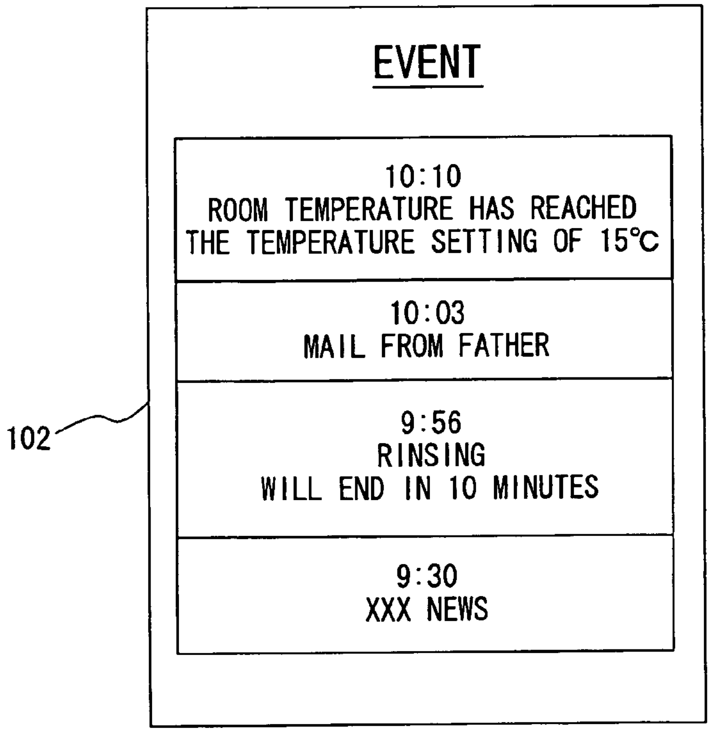
FIG. 22 is a diagram to describe a screen to display event information in a remote-control device according to an embodiment of the present invention.

When the user selects a rectangular frame in which the event label is displayed through an operation at key input unit 103 (S10), as in FIG. 19, for example, and the decision key is operated (YES at S11), control unit 150 generates display information from the event information stored in RAM 202 (S16). An example of LCD 102 displaying this display information is shown in FIG. 22. The event information set forth above is displayed.

[Operation of Gateway Device 106]

CPU 800 conducts radio communication with communication adaptor 108 connected to air conditioner 111. This is an event information request process. CPU 800 receives information representing the operation state of air conditioner 111 and the sensor measurement value from communication adaptor 108 (S64). These values correspond to the event information. CPU 800 supplies the event information to transmission signal generation unit 809 (S66). The event information here includes information representing the time when the information is received from air conditioner 111. Accordingly, the air conditioner data reception time can be displayed at LCD 102, as shown in FIG. 20.

Communication system 100 set forth above can provide the following advantages.

<Remote-Control, Control Confirmation>

The user can control the air conditioner through radio communication even from a site remote from the air conditioner by means of a gateway device. Furthermore, the operation status of the air conditioner can be identified by receiving information simultaneously from the air conditioner main unit at the remote-control device.

In the case where application software is incorporated, obtaining the latest news information upon connection to the Internet through telephone line 112, as an application software executed at the control unit of the gateway device, event information can be transmitted to the remote-control device when the latest news is obtained to allow the latest news to be presented to the user based on the application.

Furthermore, the user is allowed to operate the application executed by the gateway device. By operating the application that operates an appliance such as an air conditioner, respective appliances can be operated.

In the case where a plurality of appliances are controlled from remote sites, it is no longer necessary to use the remote controller equipped with each appliance. Accordingly, administration of the location of the remote controller is facilitated. The user has to carry only one remote controller for the control of an appliance.

<Restriction Through ID>

An application that is allowed to be used depending upon the user can be provided by administrating the user ID, remote-control device ID, and application software at the gateway device. For example, in the case where there are a plurality of appliances in a child's room and radio communication is established with the gateway device through a communication adaptor, it is possible to restrict the usage of the appliances in the child's room to only the user with the child's ID.

<Low Cost through Adaptor and Application>

By using a communication adaptor of light load directed to only the processing of protocol conversion for communication with a gateway device, and transmitting a control signal from the application software executed at the gateway device, complex control of appliances can be conducted through the application software. For example, the application directed to operating the air conditioner can obtain and store the power consumption information from the air conditioner to calculate how much power has been used in time series, and notify the same to the user.

In addition, desired control of an appliance corresponding to the needs of each user can be effected readily by exchanging the software with another software. For example, a user that does not require complicated control can control the air conditioner using an air conditioner application that includes only simple control information.

In addition, by using software that includes a plurality of types of display information and that can have the display information customized, the user can select and/or customize intentional display information suiting his/her preference.

In addition, an application directed to controlling a plurality of apparatuses in an integrated manner can be executed and used on a gateway device. For example, in the case where a plurality of air conditioners, heaters, electric fans, and the like of domestic usage can communicate with a gateway device through a communication adaptor such as the air conditioner of the present embodiment, the air condition in a room can be administered in an integrated manner by using an application integrating these appliances.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

Since an appliance connected to a network and absent of a high-level circuit can be controlled at high level as set forth above, the present invention can be advantageously applied to the field of industry such as fabricating an apparatus directed to processing information.

The invention claimed is:

1. A gateway device comprising:

a communication device, communicably linked to a remote-control device and appliances, for receiving operation information from said remote-control device, wherein, said operation information includes an instruction from one of users to control at least one of said appliances, and said communication device includes a plurality of communication means selectively used according to a communication destination; and a controller configured to control said gateway device, said controller including a storage device for storing permitted appliance information in correspondence with each of said users, said permitted appliance information representing permitted appliances which each of said users is permitted to operate among said appliances, and storing control application programs respectively corresponding to said appliances, each of said application programs representing information processing to form control information from said operation information, and a processing unit for i) forming, based on said permitted appliance information stored in said storage device, first display information for prompting the user of a transmission source to select one of permitted appliances and controlling said communication device to transmit said first display information to said transmission source when said communication device receives user identification information identifying said user of said transmission source of said operation information and an authentication request requesting identification of said appliance, ii) forming, based on transmission source information identifying the remote-control device of said transmission source, second display information representing a user interface for prompting said user of said transmission source to select an operation of the permitted appliance selected based on said first display information, and transmitting said second display information to said transmission source by said communication device, iii) receiving, by said communication device as a reply to said second display information, information including said operation information and destination information identifying the selected permitted appliance, and converting, based on said application program, said received operation information to control information representing an operation control of said selected permitted appliance, and iv) controlling said communication device such that said control information is transmitted to said selected permitted appliance.

2. The gateway device according to claim 1, wherein said processing unit records time when said received operation information is converted to control information, wherein said processing unit further controls said communication device to transmit information representing said time to said transmission source.

3. The gateway device according to claim 1, wherein said transmission source information includes user identification information identifying said user of said transmission source and transmission source device information identifying said remote-control device of said transmission source, wherein said processing unit controls said communication device such that information including transmission destination information is transmitted in a manner suiting said remote-control device of said transmission source and said user of said transmission source based on said user identification information and said transmission source device information.

4. A control method for controlling at least one of appliance by a remote-control device through a gateway device, comprising:

storing, in a storage device of the gateway device, permitted appliance information in correspondence with each of said users, said permitted appliance information representing permitted appliances which each of said users is permitted to operate among said appliances, and control application programs respectively corresponding to said appliances, each of said application programs representing information processing to form control information from said operation information;

communicating information, by communication device of the gateway device, with the remote-control device and at least one of the appliances, to receive from said remote-control device operation information including an instruction from one of users to control at least one of said appliances, wherein said communication device includes a plurality of communication means selectively used according to a communication destination;

forming, by a processing unit of said gateway device based on said permitted appliance information stored in said storage device, first display information for prompting the user of a transmission source to select one of permitted appliances and controlling said communication device to transmit said first display information to said transmission source when said communication device receives user identification information identifying said user of said transmission source of said operation information and an authentication request requesting identification of said appliances, forming, by said processing unit based in transmission source information identifying the remote-control device of said transmission source, second display information representing a user interface for prompting said user of said transmission source to select an operation of the permitted appliance selected based on said first display information, and transmitting said second display information to said transmission source by said communication device, receiving, by said communication device as a reply to said second display information, information including said operation information and destination information identifying the selected permitted appliance, and converting, based on said application program, said received operation information to control information representing an operation control of said selected permitted appliance, and controlling, by said processing unit, said communication device such that said control information is transmitted to said selected permitted appliance.

5. A computer-readable recording medium having a control program for controlling at least one of appliances by a remote-control device through a gateway device recorded to cause a computer to realize the steps of:

storing, in a storage device of a gateway device, permitted appliance information in correspondence with each of said users, said permitted appliance information representing permitted appliances which each of said users is permitted to operate among said appliances, and control application programs respectively corresponding to said appliances, each of said application programs representing information processing to form control information from said operation information;

communicating information, by communication device of the gateway device with the remote-control device and at least one of the appliances, to receive from said remote-control device operation information including an instruction from one of users to control at least one of said appliances, wherein said communication device includes a plurality of communication means selectively used according to a communication destination;

forming, by a processing unit of said gateway device based on said permitted appliance information stored in said storage device, first display information for prompting the user of a transmission source to select one of permitted appliances and controlling said communication device to transmit said first display information to said transmission source when said communication device receives user identification information and an authentication request requesting identification of said appliance;

forming, by said processing unit based on transmission source information identifying the remote-control device of said transmission source, second display information representing a user interface for prompting said user of said transmission source to select an operation of the permitted appliance selected based on said first display information, and transmitting said second display information to said transmission source by said communication device;

receiving, by said communication device as a reply to said second display information, information including said operation information and destination information identifying the selected permitted appliance, and converting, based on said application program, said received operation information to control information representing an operation control of said selected permitted appliance; and controlling, by said processing unit, said communication device such that said control information is transmitted to said selected permitted appliance.

* * * * *

UNITED STATES PATENT AND TRADEMARK OFFICE

CERTIFICATE OF CORRECTION

PATENT NO. : 7,631,197 B2
APPLICATION NO. : 10/551347
DATED : December 8, 2009
INVENTOR(S) : Niwamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Second Day of November, 2010

David J. Kappos

David J. Kappos
*Director of the United States Patent and Trademark Office*